United States Patent
Sherwood et al.

(10) Patent No.: US 6,324,263 B1
(45) Date of Patent: Nov. 27, 2001

(54) DIGITAL TELEPHONE SYSTEM WITH AUTOMATIC ROUTING BASED UPON CALLER ID

(75) Inventors: Charles Gregory Sherwood, Olathe; Charles Edward Yahn, Bonner Springs, both of KS (US)

(73) Assignee: Dialogic Corporation, Parsippany, NJ (US)

(*) Notice: Subject to any disclaimer, the term of this patent is extended or adjusted under 35 U.S.C. 154(b) by 0 days.

(21) Appl. No.: 09/144,511

(22) Filed: Aug. 31, 1998

(51) Int. Cl.[7] .................... H04M 1/64; H04M 11/00; H04M 3/00
(52) U.S. Cl. .............. 379/88.19; 379/70; 379/93.05; 379/242; 379/265.02; 379/265.11; 379/67.1
(58) Field of Search ............... 379/67.1, 69–70, 379/71, 72, 76, 82, 84, 88.07, 88.11, 88.12, 88.16, 88.17, 88.19, 88.2, 88.21, 93.03, 93.01, 93.05, 93.17, 93.35, 242, 265, 265.01, 265.02, 265.1, 265.11, 93.26, 386

(56) References Cited

U.S. PATENT DOCUMENTS

| | | | |
|---|---|---|---|
| 4,757,525 | * 7/1988 | Matthews et al. | 379/88 |
| 4,985,913 | 1/1991 | Shalom et al. | 379/76 |
| 5,029,196 | * 7/1991 | Morganstein | 379/67.1 |
| 5,255,183 | 10/1993 | Katz | 364/406 |
| 5,329,578 | * 7/1994 | Brennan et al. | 379/67.1 |
| 5,471,519 | * 11/1995 | Howe et al. | 379/67.1 |
| 5,528,680 | 6/1996 | Karpicke | 379/355 |
| 5,550,900 | 8/1996 | Ensor et al. | 379/67 |
| 5,752,191 | * 5/1998 | Fuller et al. | 455/445 |
| 5,875,234 | * 2/1999 | Clayton et al. | 379/93.05 |
| 6,034,953 | * 3/2000 | Smith, Jr. | 370/359 |
| 6,125,127 | * 9/2000 | Smith, Jr. | 370/524 |

* cited by examiner

Primary Examiner—Allan Hoosain
(74) Attorney, Agent, or Firm—Pillsbury Winthrop LLP

(57) ABSTRACT

A telephone system including improved automated routing of telephone calls based upon caller ID data. If caller ID data is received, it is used as a search key to search a routing table listing extensions normally called by one or more persons identified by their caller IDs. If a match is found, the call is automatically transferred to the extension or voice mail box listed in the routing table. In some embodiments, the caller is given options to block the automatic routing or block recording of a voice mail message in favor of transfer to a caller specified extension or to an attendant. Also disclosed is improved voice mail wherein a digital signal processor scans data to be recorded in a voice mail message to find DTMF tones or DTMF mimics in the voice data and removes them from the recording so that no false DTMF commands will be recognized during playback by any DTMF detector which is active during the playback.

17 Claims, 19 Drawing Sheets

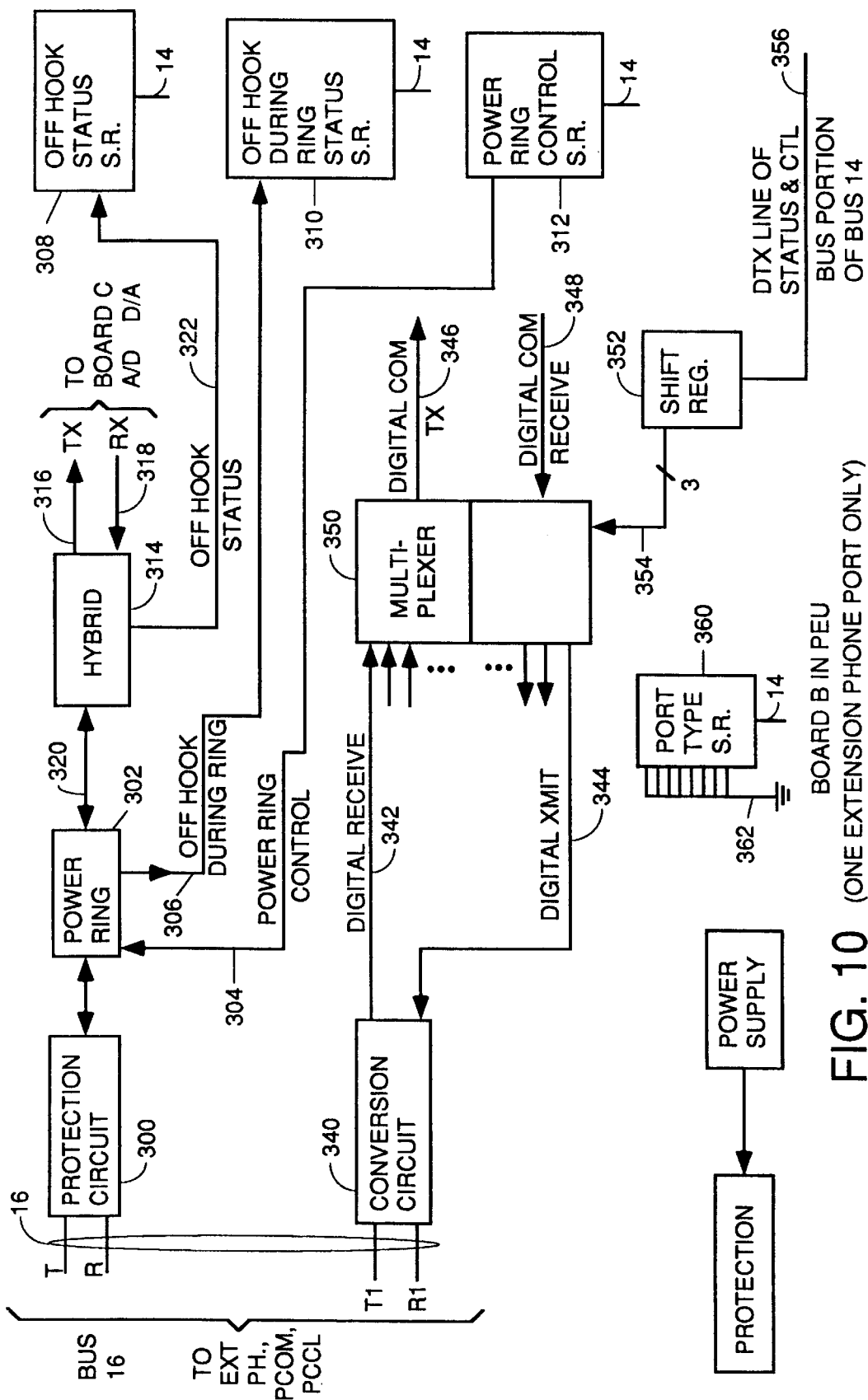
FIG. 10 (ONE EXTENSION PHONE PORT ONLY)

BOARD C (ONE PORT) IN CSU

SWITCH CARD IN CSU

HOST ADAPTER IN CSU

DIGITAL TELEPHONE SYSTEM WITH AUTOMATIC ROUTING BASED UPON CALLER ID

BACKGROUND OF THE INVENTION

The invention pertains to improvements in the field of touch tone telephone systems having multiple extensions to which incoming calls need to be directed. Specifically, the invention provides the ability to route incoming calls automatically by detecting the caller ID and routing the call to the extension most often called by the person having that caller ID.

Caller ID has been in the prior art for several years now on personal and business lines. Caller ID is a system wherein the name and telephone number of the person making the call is transmitted to the called party using digital data transmitted between the first and second rings of a telephone call if the called party has subscribed to caller ID service. If the called party has subscribed to caller ID service and has a caller ID decoder or reception device or has a telephone which is capable of detecting and decoding the caller ID signals, the called party will be shown a display of the name and telephone number of the person who originated the call if that person has not put a block on their name and/or phone number or an error occurs.

Many prior art telephone systems and stand alone caller ID display devices can display caller ID information, but they are incapable of making automatic routing decisions based upon the caller ID information.

The prior art includes computer systems which receive information about the calling party and uses it. One example is U.S. Pat. No. 5,255,183. This patent teaches a system including a computer having hardware for interfacing the computer with the public telephone network. Incoming calls include automatic number identification data which identifies the calling telephone. The computer is further programmed to accept personal identification codes from the caller. The computer system uses the ANI data and the personal ID data from the caller to generate reports which indicate the location from which and time each caller called in so as to keep track of employees arrival and departure times from remote job sites.

U.S. Pat. No. 5,550,900 discloses a telephone message system which has a controller unit with caller ID capability which has one or more adjunct telephones all coupled to the controller by bridged connections to a single pair. The controller unit interfaces with a central provider through a video services network. A message routing capability is provided by providing for every party at the residence a mailbox of groups of telephone numbers of callers that typically call that party. These telephone numbers are provided to the controller unit. Upon receipt of a call from one of the telephone numbers, identified through caller ID, the incoming call is associated with the particular called party and the controller unit routes the call directly to the called party's mailbox where the caller leaves a message. The called party retrieves the messages in his mailbox only if the mailboxes are restricted access or other mailboxes if they are open.

U.S. Pat. No. 4,985,913 teaches an answering machine which stores a number of different messages each associated with a particular phone number. When a call comes in, the phone number of the caller is identified through caller ID data, and the answering machine compares the phone number with the list of phone numbers having associated messages. If a match is found, that message is played to the caller.

U.S. Pat. No. 5,528,680 teaches a telephone with automatic dialing capability which stores its own area code given to it by a user in an initialization step which is performed when the phone is installed or moved to a different area code. The phone stores incoming caller ID information including the area codes in the dialer memory. When a user requests the dialer to dial the number of a particular party, the phone dialer automatically compares its home area code with the area code it has stored for the number of the party to be called, and if the two area codes are different, the dialer automatically includes the area code in the dialed telephone number.

The specific problem to which the system of the invention provides a solution is the need for businesses which receive many phone calls to lower the labor costs associated with answering and routing such calls.

A need has arisen for a telephone system which can automatically route incoming calls based upon caller ID information.

SUMMARY OF THE INVENTION

The invention defines a genus of species all of which are capable of automatically routing incoming telephone calls based upon caller ID information sent with the ring signal. The particular hardware or software used to perform this function is not critical and any circuitry and/or software which can perform this function will suffice to practice the invention.

The telephone system described herein is intended to be only one example of the many systems in which the invention can be usefully employed. Any system which performs the functions of trapping the caller ID information and use it to make routing decisions and route the call automatically to the appropriate extension based upon the routing decision will suffice to practice the invention.

In a typical species within this genus, a company telephone system will have many extensions and one central computer station with an interface card connected to one or more incoming telephone lines from the telephone company central office. The computer will also be coupled to the various extensions by separate lines. A routing table will be kept in the central computer having caller IDs of callers that frequently call the company and the extension number that those callers usually call. When one of the persons whose identity is stored in the routing table calls the company, the caller ID information transmitted with the call will be trapped and used as a search key into the routing table. The extension number that the caller usually calls will be extracted from the table or otherwise used to cause appropriate switching to route the call to the extension that caller usually calls. In other embodiments, the search key will be used to search a routing table to find a PBX internal telephone extension, an extension external to a PBX or voice mail box or boxes or voice or radio paging devices associated with the caller ID data for use in routing the call. After the predetermined destination is found from the routing table using the CID, a command will be generated to automatically transfer the call to the predetermined destination.

The routing table can map a large number of different caller IDs to the same extension.

In some embodiments, the caller receives a recorded announcement giving the caller an option to press one or more keys to bypass the automatic routing function and be directed to an attendant for manual routing.

Another form of call routing is based upon Direct Inward Dialing. In these embodiments, each incoming call includes a direct inward dialing (DID) telephone number representing the number the calling party dialed instead of the number from which the calling party called from. These embodiments use the DID number as a search key into the routing table to find the extension number that corresponds to the DID number. That extension number is then used to route the call.

The genus of the invention enables lowering labor cost for businesses by making it possible to eliminate a receptionist whose sole job it is to receive calls and route them manually to the appropriate party. For a very high volume of calls, the genus of the invention makes it possible to at least substantially reduce the workload of a receptionist or reduce the number of required receptionists by automatically routing some calls using caller ID information to the person or extension mapped to that caller ID in a routing table thereby eliminating the need for operator intervention.

BRIEF DESCRIPTION OF THE DRAWINGS

FIG. 10 shows a block diagram of the circuitry for one extension phone port on board B in the PEU 10 in FIG. 1.

DETAILED DESCRIPTION OF THE PREFERRED EMBODIMENT

Figure 1:
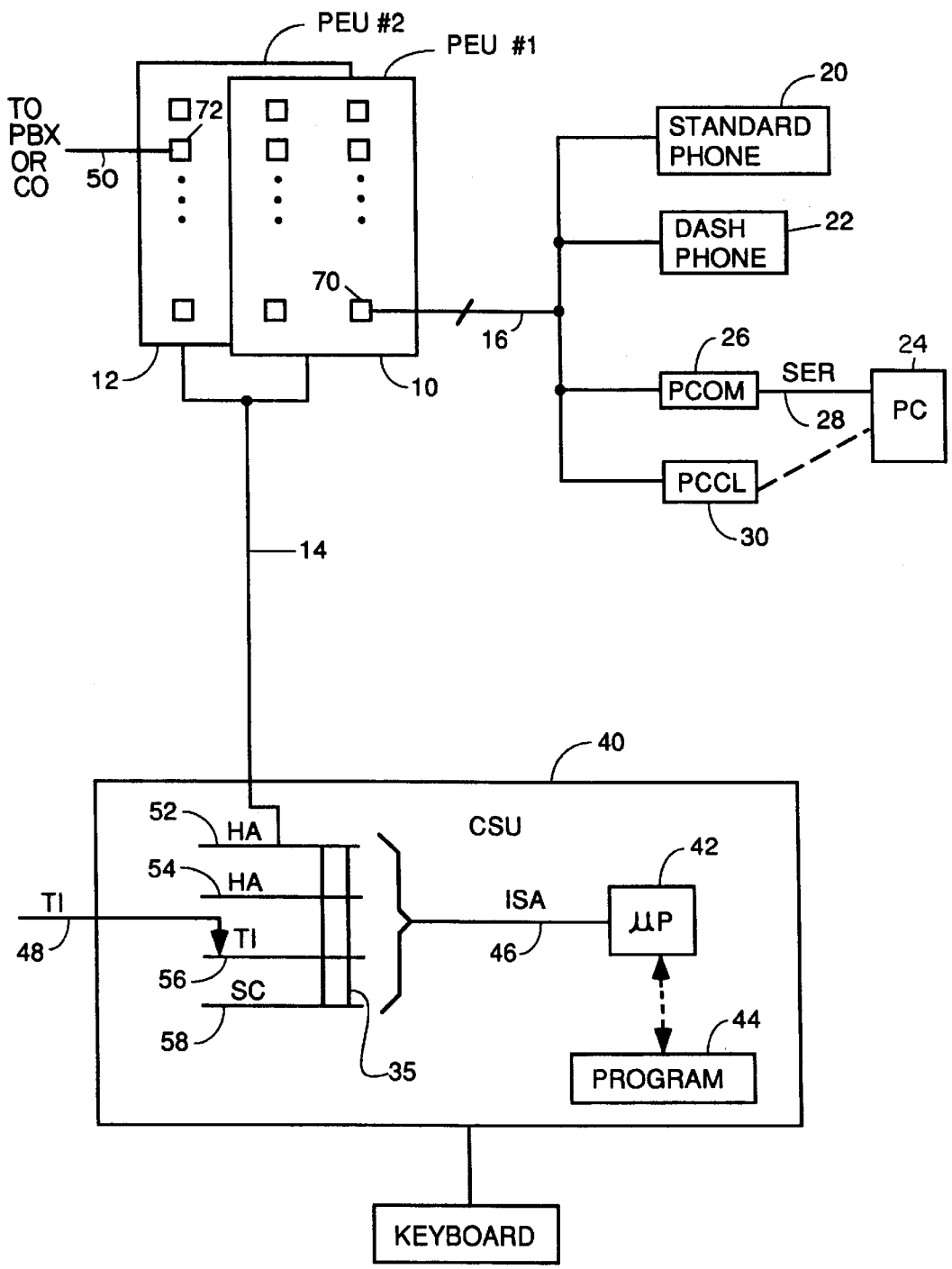
FIG. 1 is a block diagram of one type telephone system in which the system of the invention can be usefully employed.

Referring to FIG. 1, there is shown a block diagram of a digital telephone system with voice mail capability at the user site in which the system of the invention may be employed. The invention is not limited to the particular telephone system shown in FIG. 1 and can be employed in telephone systems having different configurations than that shown in FIG. 1 so long as the defining characteristics of the genus defined in the summary of the invention are present in each species.

The system is comprised of first and second port expansion units (PEU) 10 and 12 coupled together by digital bus 14. The PEUs 10 and 12 each have a plurality of modular connectors to which individual drop lines such as drop line 16 are connected. Each drop line is a bus with analog tip and ring lines to carry analog voice signals back and forth to the extension phones and digital T1 and R1 lines carrying certain signals and power and ground lines. The PEU converts all analog voice signals coming in from the extension phones to digital data for transmission on bus 14 to the Central Switching Unit (CSU) 40, and all digital data coming from the CSU destined for any extension phone is converted in the PEU back to analog signals for transmission to the particular extension phone for which it is bound. Conversion to the digital domain is used because the CSU switching functions to connect various extension phones to each other or to the central office are all done using digital switching circuitry and various digital signal processors are used in the CSU to monitor call progress and do gain control etc. Typically, the CSU is a personal computer such as any 486 microprocessor type platform with special software coupled by a data path to several expansion cards to be described below and referred to in FIG. 1 by their abbreviations HA, T1 and SC.

Each drop line couples a port of the PEU to any or all of a number of different type of telephone equipment peripherals. These peripherals include a standard telephone 20, and a specially designed Dash phone 22 of a type which has been in public use for more than a year and which is commercially available from Picazo Communications of Lenexa, Kans. Each drop line may also couple a port of the PEU to a personal computer 24 through a PCOM circuit 26 and a serial bus 28 and/or a PCCL circuit 30 which is an expansion card in the PC 24. The PCOM and PCCL circuits 26 and 30 are well known having been in public use for more than a year. These circuits are also commercially available from Picazo Communications of Lenexa, Kans. and from other sources. The PCOM and PCCL circuits are hardware interfaces with software conforming to the TAPI telephone application programmatic interface and controlled by software run on the PC 24 which allow well known computer-telephone interface services to be implemented such as automatic dialers, call timers, handle multiple calls etc.

Up to eight port expansion units may be added to the system along with the required host adapters to add or delete phones. Each PEU has 16 ports eight of which are selectable between connection to a telephone line from the central office (CO) or an extension phone/CTI equipment, and the other eight of which may be coupled to extensions only. On the ports coupled to telephone lines from the central office, caller ID can be detected.

The multiple PEUs are coupled by digital bus 14 to a central switching unit CSU 40. The CSU 40 is a DOS based machine which includes a microprocessor 42 under control of program 44 and coupled via an ISA bus 46 to multiple circuit cards. Although some of the claims refer to an ISA bus, this term should be understood to mean whatever data, address and control bus and protocol is used by the microprocessor or other computer executing the PBX switching and control process. The control program 44 controls the microprocessor 42 to carry out a PBX switching and control process which is referenced in later drawings as PBX process 211. The multiple circuit cards include one or more host adapter cards each of which couples one, two, three or four PEUs to the CSU. Circuit cards 52 and 54 are typical of the host adapter cards. The CSU may also contain a T1 interface circuit 56 which interfaces the CSU to a T1 line 48 from any telephone company provider of T1 high capacity services. Each T1 line can carry 24 voice time-division-multiplexed channels on two pairs of wires. If a T1 line is coupled to the CSU, the PEUs are not needed other than for coupling the CSU to extension phones so all optional ports can be programmed to connect to phones.

The CSU also contains one switch card 58 which serves to switch digital traffic between various extension phones or between extension phones and the CO. The switch card will be described in greater detail later. The circuitry of the switch card 58, the T1 card 56 and the host adapter cards 52 and 54 are well known and in the prior art and are commercially available from Picazo Communications of Lenexa, Kans.

Caller ID information can be received either by the CSU over the T1 line 48 or via the regular telephone line 50 from the central office (CO) of a telephone service provider directly or through a PBX. Hereafter, the telephone line 50 will be assumed to come directly from a telephone service provider central office with the understanding that the system depicted in FIG. 1 can also sit behind a PBX. The ring signal on the CO line is carried on the single pair of the telephone line 50. The ring signal is a high voltage AC signal from 40–120 VAC with a frequency from 15–63 Hertz, typically 20 Hz.

Figure 2:
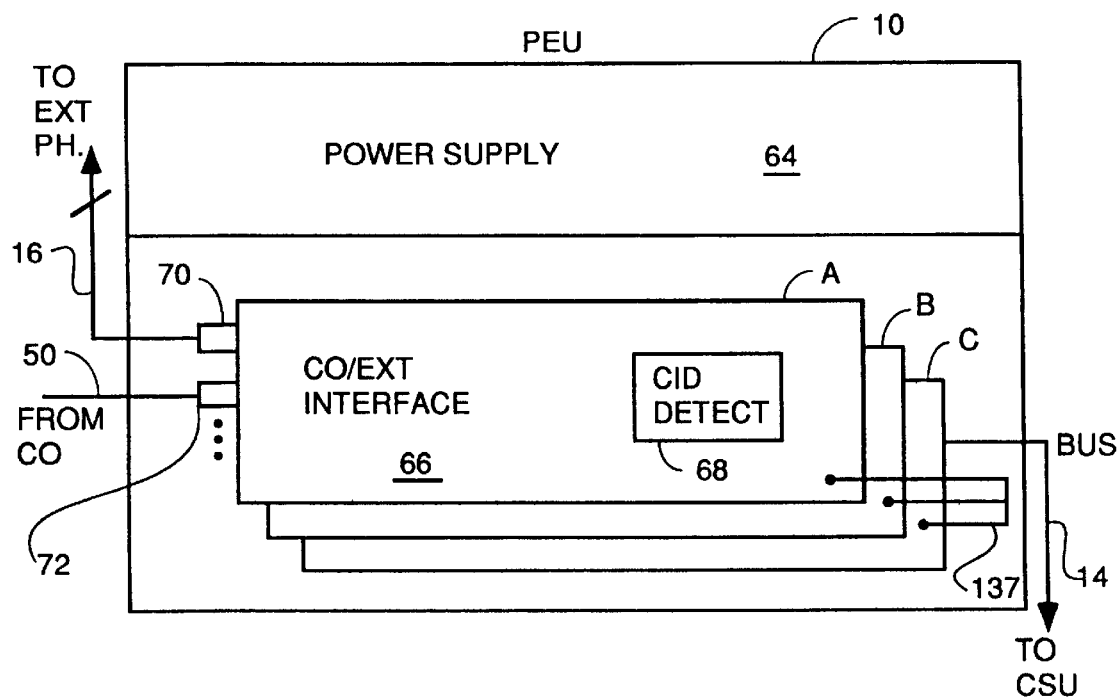
FIG. 2 is a layout diagram of the physical configuration of the PEU.

FIG. 2 is a layout diagram of the structure of a typical PEU. It is comprised of a power supply 64, a CO/extension phone interface circuit 66 and a caller ID detect circuit board 68 which is plugged into the interface circuit board 66 as an option. The CO/extension phone interface circuit 66 has a plurality of modular plugs such as port 70 to which an extension phone is coupled via drop line 16 and port 72 to which a telephone line 50 from the CO or PBX is coupled. The circuitry of the CO/extension phone interface circuit 66 and the circuitry and software of the caller ID detect circuit 68 that does caller ID detection (but not automatic routing based upon caller ID) is well known and has been in public use for more than one year. It is new however to have the caller ID detect circuit as an option card which plugs into the CO/extension phone interface circuit 66 inside the PEU. In prior art DASH phone systems, the caller ID detect circuit 68 was an external module that plugged into the CO ports such that the CO line would plug into the module and the module would plug into the port. Incoming telephone calls then passed through the module and caller ID information was detected as the call passed through.

The caller ID detect circuit 68 is commercially available from Picazo Communications of Lenexa, Kans., but any caller ID detection circuit that can function as described herein to transfer caller ID information to the process which carries out caller ID based automatic routing will suffice to practice the invention.

The CO/extension phone interface circuit 66 will be called board A hereafter and its circuitry is well known in the art as having been in public use for more than one year. The PEU is also comprised of two other boards labelled board B and board C in FIG. 2. Boards B and C are also known in the art having been in public use for more than a year. They are commercially available from Picazo Communications of Lenexa, Kans., but any other circuit that can function as described herein will suffice. Board B functions to interface eight ports connected to extension phones such as port 70 in FIG. 1. Board C functions to perform analog-to-digital and digital-to-analog conversions and has a DTMF tone detector thereon. Boards A, B and C are coupled together by an internal bus 137 and are coupled to bus 14. Bus 14 carries voice in digital data form and is coupled to board C.

Figure 3:
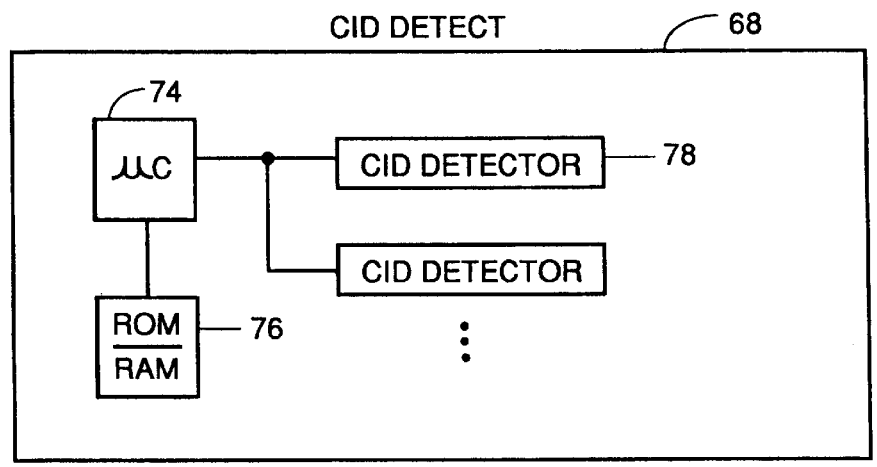
FIG. 3 is a block diagram of parts of the CID detect circuit pertinent to caller ID detection.

The structure of the caller ID detector circuit 68 is shown in FIG. 3. It is comprised of a microcontroller 74, ROM/RAM program and working memory 76, and a plurality of caller ID integrated circuits of which chip 78 is typical. The caller ID circuits are commercially available from Mitel under the designation MT8841A. Because the CO/extension phone interface circuit 66 has 8 ports which may be programmed for coupling to a telephone line from the CO, the caller ID detector circuit 68 includes 8 caller ID detection chips like chip 78. When a call rings which has caller ID information, the caller ID chip for the associated port detects the caller ID information and passes it to the microcontroller 74 which stores it in RAM 76 for later access by a host adapter 52 in the CSU 40. The CSU microprocessor 42 can then use the caller ID information for various purposes such as routing the call.

Figure 4:
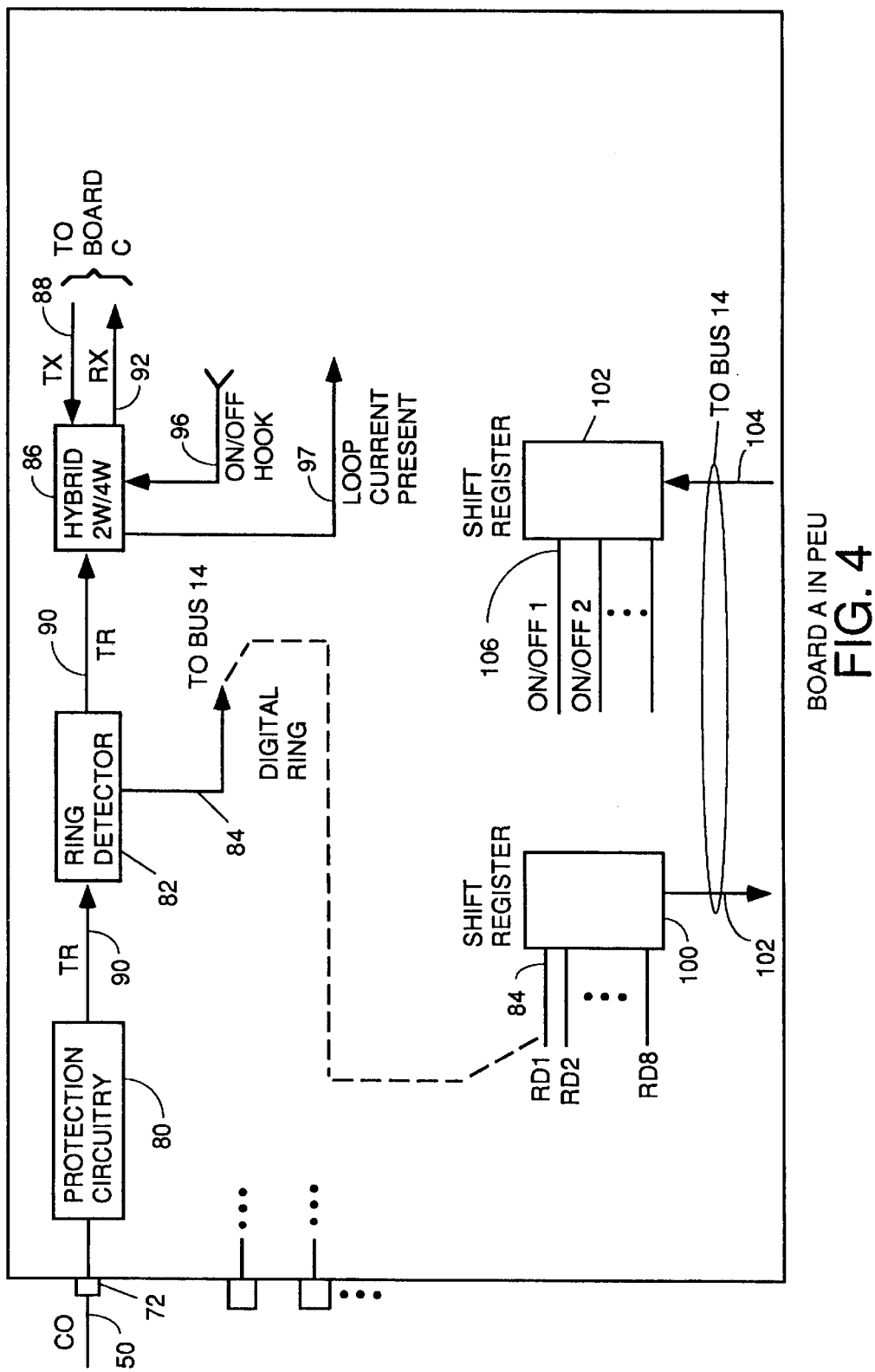
FIG. 4 shows a block diagram of the A board which connects the PEU 10 in FIG. 1 to one or more central office telephone lines.

FIG. 4 shows a block diagram of the A board which connects the PEU 10 in FIG. 1 to one or more central office telephone lines. The structure of the A board has been in public use for more than a year. The CO telephone line 50 couples to a protection circuit 80 on this board which serves to protect the circuitry on the board from surges or spikes of voltage on the telephone line. A ring detector 82 is coupled to the protection circuitry to detect ring signals on the CO line and convert the ring signal to a digital logic level on line 84. Line 84 is coupled to the CSU 40 in FIG. 1 via bus 14.

A hybrid circuit 86 is coupled to the CO telephone line 50 through the ring detector 82 and the protection circuit 80. There are 8 circuits like that shown on FIG. 4 on the A board, one for each of the 8 CO ports. Hybrid circuits are well known in the art and function to perform a 2-wire to 4-wire conversion to multiplex transmit analog signals on pair 88 onto pair 90 and take received analog signal on pair 90 and put them onto pair 92. Pairs 88 and 92 are coupled to the C board for D/A and A/D conversion. There are jumpers on the A board which can turn it into an interface to connect to extension phones. When so converted, the ring detector 82 becomes an off-hook detector, and a digital control circuit inside hybrid 86 tells the hybrid to produce a power ring in accordance with a logic signal on line 96. When the hybrid is in an on-hook configuration, there is no DC coupling between the tip and ring lines of the pair 90 (high DC resistance between tip and ring). When the hybrid is commanded to be off-hook, the DC resistance between the tip and ring lines of pair 90 is controlled by hybrid 86 to be low. This is how the phone company central office equipment tells whether the hybrid has gone off-hook and gives a dial tone. The on/off hook signal controls a relay in the hybrid circuit 86 to set an on-hook or off-hook condition so that the CO may think an extension phone is off or on its hookswitch even though that is not actually the case. This allows an incoming phone call to be "answered" by the PEU by receipt of an off-hook command for the appropriate port via bus 14 from CSU 40. The incoming voice signals are then digitized on the C board and transmitted to the CSU for further processing such as routing to the appropriate extension phone by virtue of the caller ID information between ring signals, playing of a standard greeting message, routing to the appropriate extension phone by virtue of DTMF extension digits dialed by the calling party etc. All this processing can happen before any extension phone is even picked up.

Another status signal generated by hybrid 86 is a Loop Current Present signal on line 97. When this signal indicates loop current is not present, the caller has hung up.

There is a digital portion of board A that functions to communicate digital data back and forth between the CSU and PEU A board. Several shift registers are used to communicate data. The 8 data outputs on lines 84 of the 8 ring detectors are coupled to 8 parallel inputs as the RD1 through RD 8 input signals to shift register 100. The shift register 100 is a parallel-in, serial-out shift register, with its serial output line 102 forming part of bus 14. Eight individual on/off hook logic signals like the on/off hook signal on line 96 are provided to the A board from the CSU via a serial-in, parallel-out shift register 102. Eight bits of input serial data to shift register 102 are provided via bus 14 and line 104. After these 8 bits are shifted in, they may be provided on 8 individual output lines such as line 106 as signals on/off 1 through on/off 8.

When a ring signal comes in on telephone line 50, the ring detector 82 generates a digital signal on line 84 indicating that a ring has occurred. This digital ring signal is transferred to the CSU via shift register 100 and bus 14. Any caller ID information is sent from the CO to the PEU via line 50 between the first and second rings. When the CSU detects the first ring, it signals the caller ID detect circuit 68 in FIG. 2 to arm and start looking for caller ID information.

Figure 5:
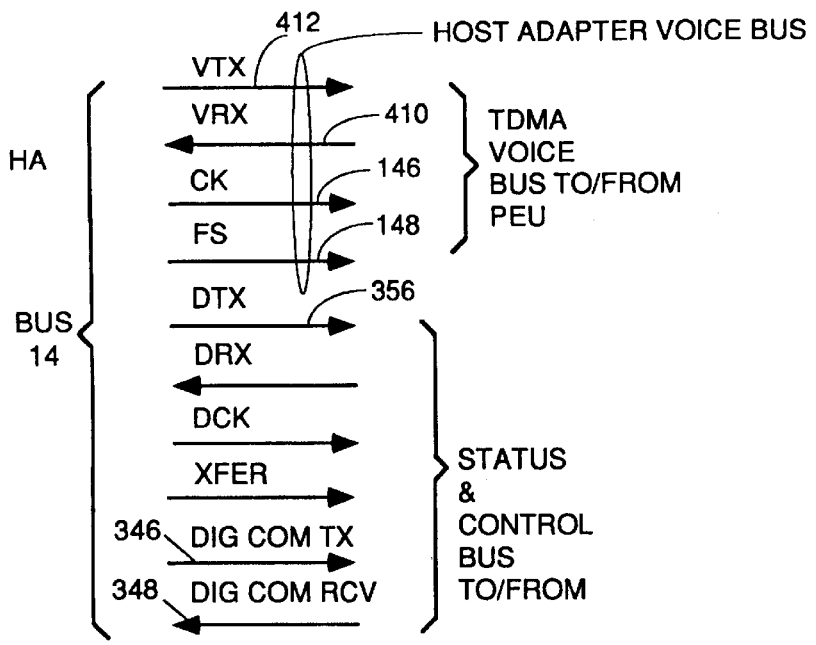
FIG. 5 a diagram of the conductors on bus 14 in FIG. 1 which connects PEU 10 to CSU 40.

Referring to FIG. 5, there is shown a diagram of the conductors on bus 14 in FIG. 1 which connects PEU 10 to CSU 40. Four conductors carrying signals VTX, VRX, CK (bit clock 146) and FS (frame sync 148) comprise a host adapter voice bus carrying voice data in digital form in timeslots using time division multiple access on the VTX and VRX lines. The VTX and VRX conductors carry time division multiplexed digital data in serial format for the transmit and receive portions of up to 32 separate conversations, one conversation per timeslot. The CK signal is a 2.048 MHz bit clock to keep the VTX and VRX signals synchronized and the FS signal is a frame synchronization signal to allow the receivers to reassemble the data packets in the individual timeslots correctly.

A status and control bus is comprised of six more conductors carrying DTX, DRX, DCK and XFER signals, and two digital communication lines. The digital communication lines carry data from the phones to the host adapter which indicate which keys were pressed and carry digital data to the phones such as call preview data and signals to light lights or do other user interface functions. The XFER signal is a hardware handshake signal that tells the shift registers that transport status and control data on the status and control bus to shift data in or shift data out their outputs as required. DTX and DRX carry the send and receive digital data and the DCK is a data clock signal which clocks data in and out of the shift registers.

Figure 6:
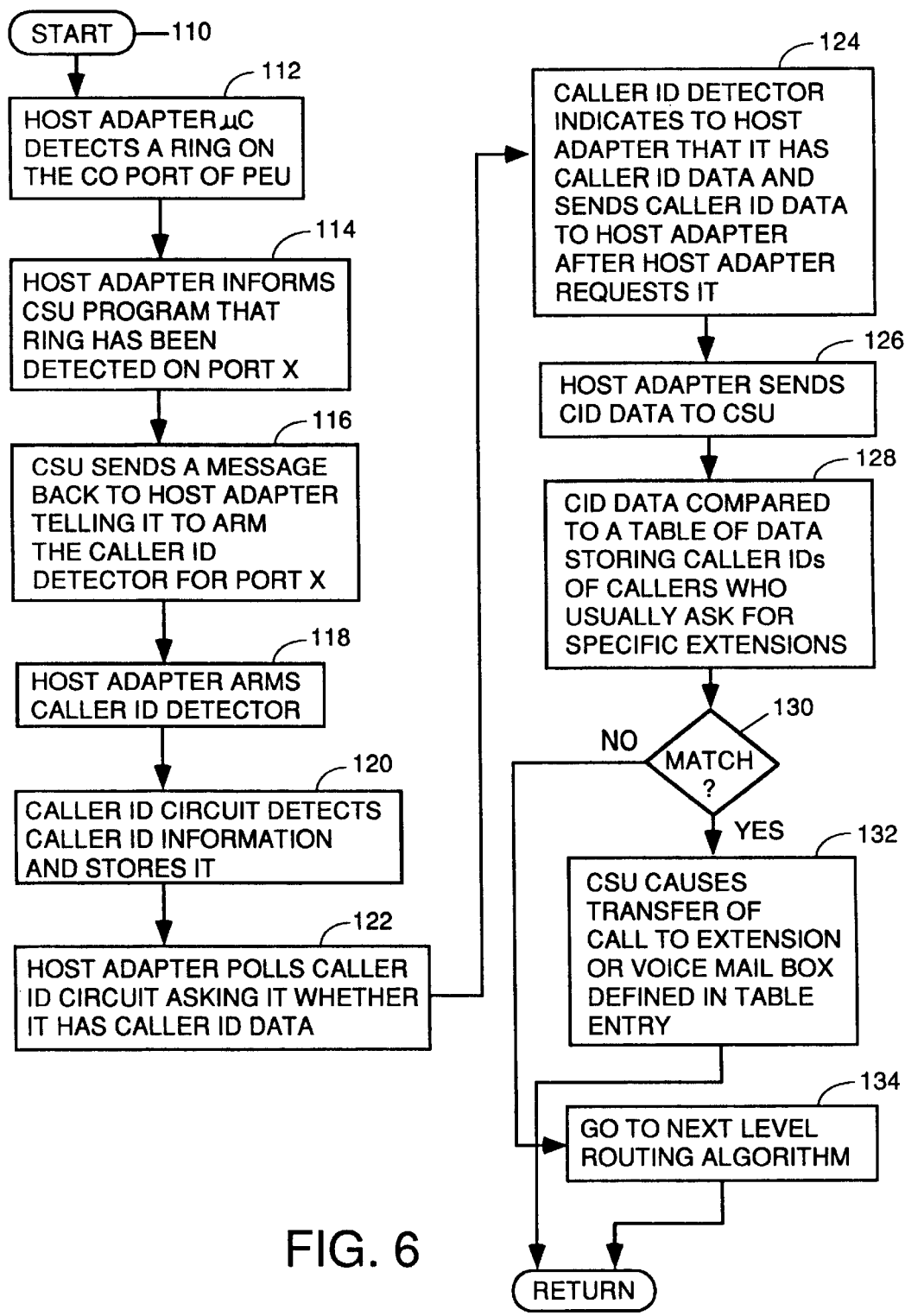
FIG. 6 is a flow diagram of the new process of caller ID routing to the appropriate extension phone based upon caller ID information of the incoming call.

The process of caller ID routing is shown in the flow chart of FIG. 6. The process starts at 110 and, in step 112, the host adapter microcontroller detects the fact that a ring signal is coming in from the CO on some port of the PEU. This process is usually carried out by scanning the data on bus 14 arriving from shift register 100.

The host adapter then informs the CSU program in step 114 that a ring has been detected on Port X where Port X is the particular PEU port which received the ring signal. In some embodiments, this is done by generating an interrupt, and, in others, it is done by polling. In the preferred embodiment it is done by sending an ISA bus packet comprised of a command byte and a data byte. Interrupts are preferably used in both directions. Typically, communication from the host adapter to the CSU is done by writing a command byte and a data byte to the interface registers on the CSU motherboard and then activating an interrupt signal.

The CSU interrupt service routine then reads the command and data bytes from the registers and sends a packet and interrupt back to the host adapter acknowledging that it has read the information. Communication from the host adapter to the CSU typically takes the form of the host adapter writing a command byte and data byte indicating for example, "I have detected a ring on Port X". An interrupt is then activated and the CSU reads the command and data bytes to learn of the ring on Port X and sends back an interrupt to the host adapter acknowledging the receipt of this information.

The CSU then executes code which sends a message back to the host adapter telling it to arm the caller ID detector circuit 68 for Port X, as symbolized by step 116, and the host adapter acknowledges the command.

In step 118, the host adapter sends a signal to the caller ID detector assigned to Port X to arm it. The caller ID circuit then looks for the caller ID information between the first and second ring and, upon detection thereof, stores it in step 120. In step 122, the host adapter polls all the caller ID circuits to determine which of them, if any, have caller ID information stored. The caller ID detection circuit assigned to monitor Port X replies to the host adapter in response to the polling request that it has caller ID information stored in step 124, and responds to a command from the host adapter to send the caller ID information by sending it to the host adapter. The host adapter then sends the caller ID information to the CSU process in step 126 via the ISA bus for use in whatever function for which it is needed such as routing the call to the proper extension based upon the caller ID information. In alternative embodiments with different kinds of caller ID detector circuits, the caller ID information can be written directly to registers on the host adapter or in the PEU board A and an interrupt generated to the CSU causing it to retrieve the caller ID data instead of waiting to be polled.

We assume for the purposes of this application that the CSU algorithm uses the caller ID (CID) data to do automatic routing, but it could also be used for other purposes such as automatically launching a business or personal contacts database or organizer, retrieving the file of the person associated with that caller ID using that caller ID as a search key in the database and displaying that person's record.

In step 128, the caller ID data stored in the CSU memory is compared to records in a routing table listing the caller IDs for all callers that typically call certain extensions. If there is a complete match (or partial match in some alternative embodiments) found in step 130, the CSU causes the CO line having the incoming call to go off-hook and sends commands to the switching circuit to cause the digital data generated from the incoming call by the A/D converter on board C coupled to that line to be routed to the extension or voice mail box of the extension listed in the routing table located in step 132. The details of the call transfer process symbolized by FIGS. 8A and 88 can be used to accomplish this automatic caller ID call transfer in the preferred embodiment so that if the called party is not there, the message will go into his or her voice mail box. After step 132 is accomplished, the caller ID routing algorithm is completed.

If there is no match, the CSU moves on to processing in a next level down routing algorithm in step 134. The next level down of routing has been in public use for more than one year, but basically, this routing algorithm may route the CO port to a fixed extension port such as the attendant or provide the caller with options to dial an extension number, opt for voice mail etc.

The circuitry that accomplishes the call transfer is centered on the switch card in the CSU. Assuming that the incoming call is an analog signal on CO line 50 in FIG. 1, the analog signals on the tip and ring lines is converted to digital data after transfer inside PEU 10 from card A to card C where the analog-to-digital converters reside. On card C, the incoming voice signals are converted to digital data and sent via the VTX lines of bus 14 to the host adapter card 52 in FIG. 1. The host adapter transfers the data to the switch card via bus 135 in FIG. 1. Bus 137 couples the A, B and C cards of the PEU together in FIG. 2.

Figure 19A:
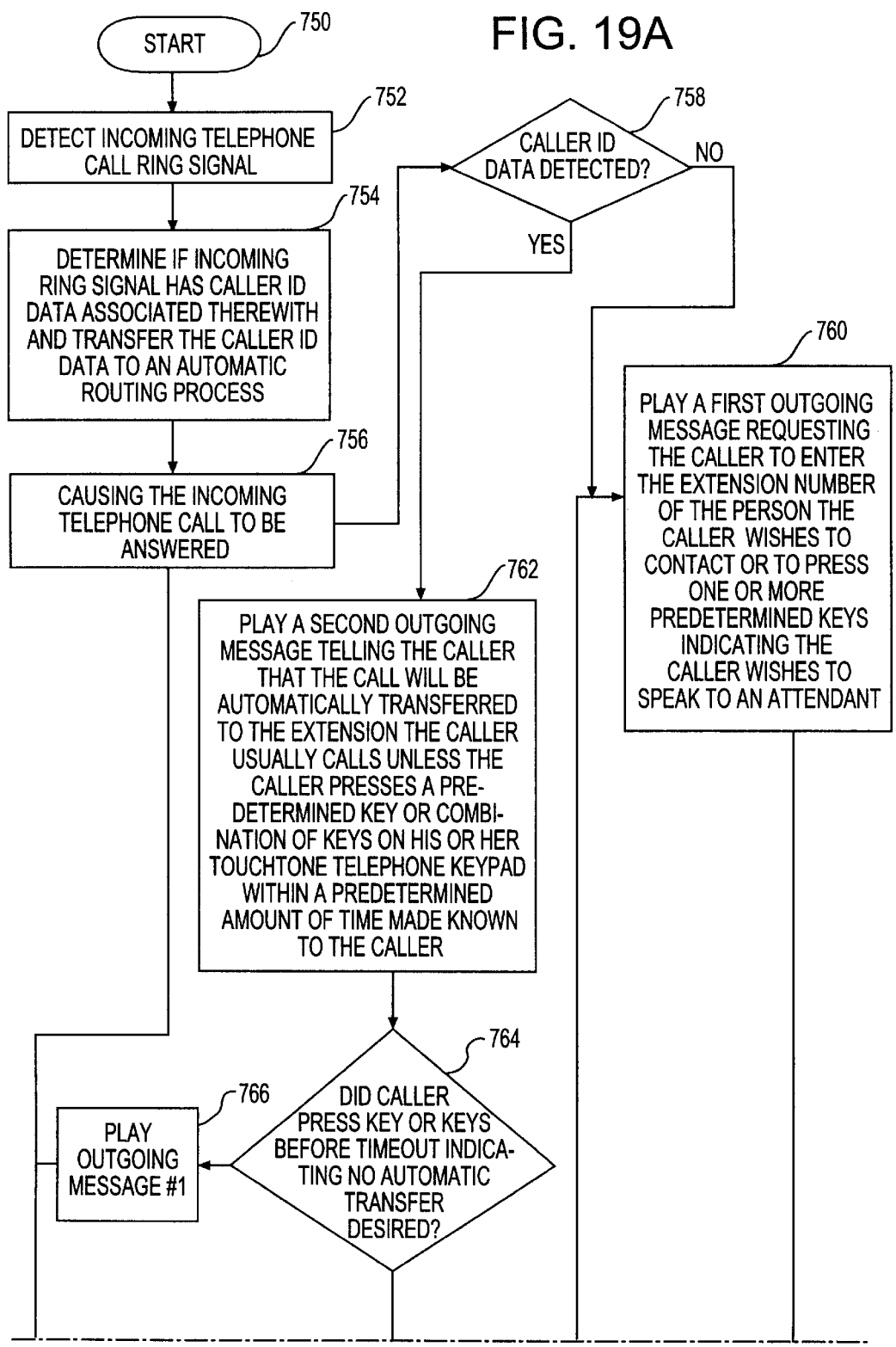
FIGS. 19A and 19B are a flowchart of an alternative automatic call routing process wherein the user can request transfer to a user entered extension in lieu of automatic transfer to the extension listed for that caller ID in a routing table.
Figure 19B:
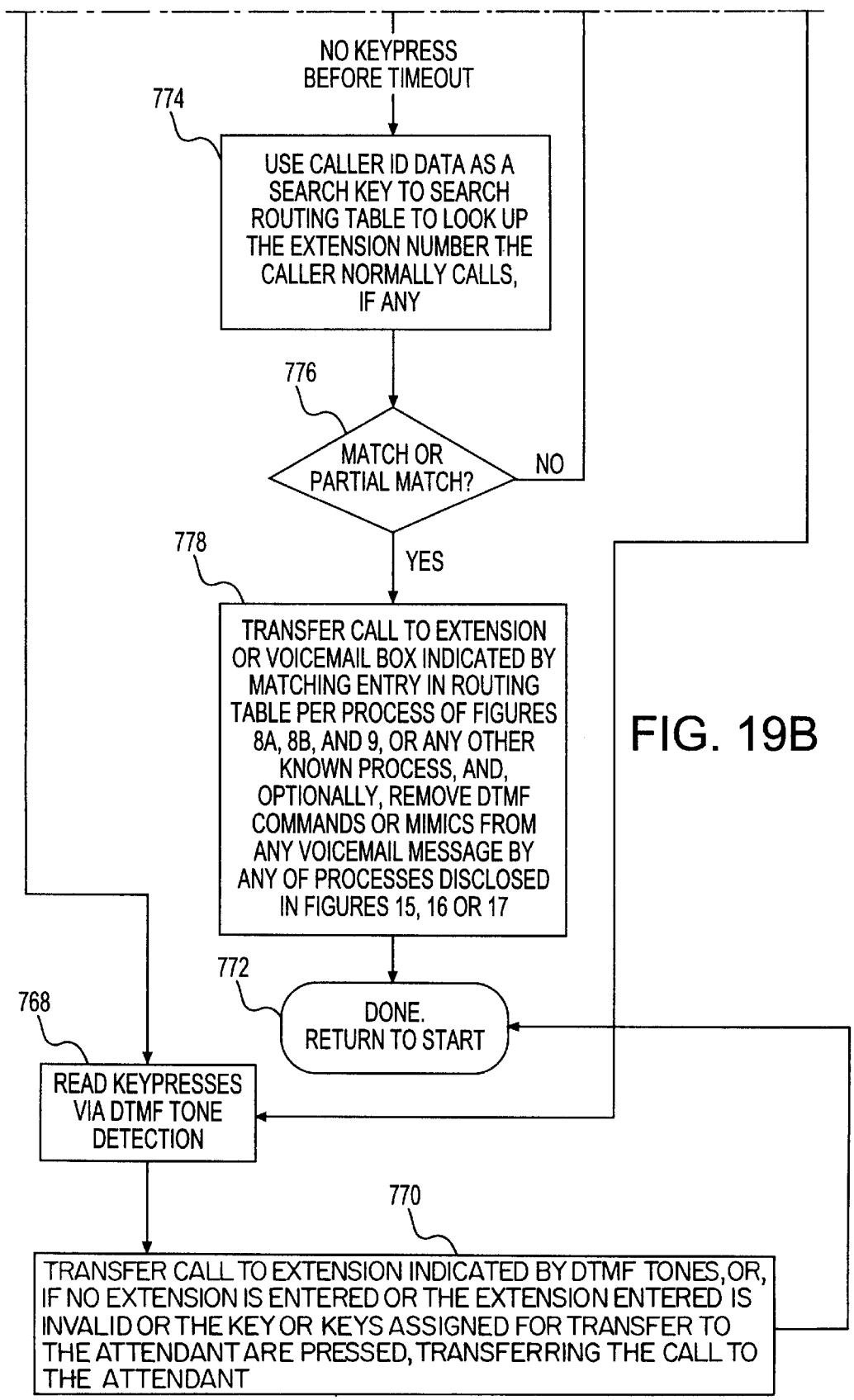

But what happens if the caller does not want to be automatically routed? If the caller does not want to talk to the person to whom her call is automatically routed, she has several options the preferred one of which is shown in the flowchart of FIGS. 19A and 19B. Another alternative is she can ask the person to who she has been automatically transferred to transfer her to whoever she does want to talk to if the person picks up the phone.

Figure 20:
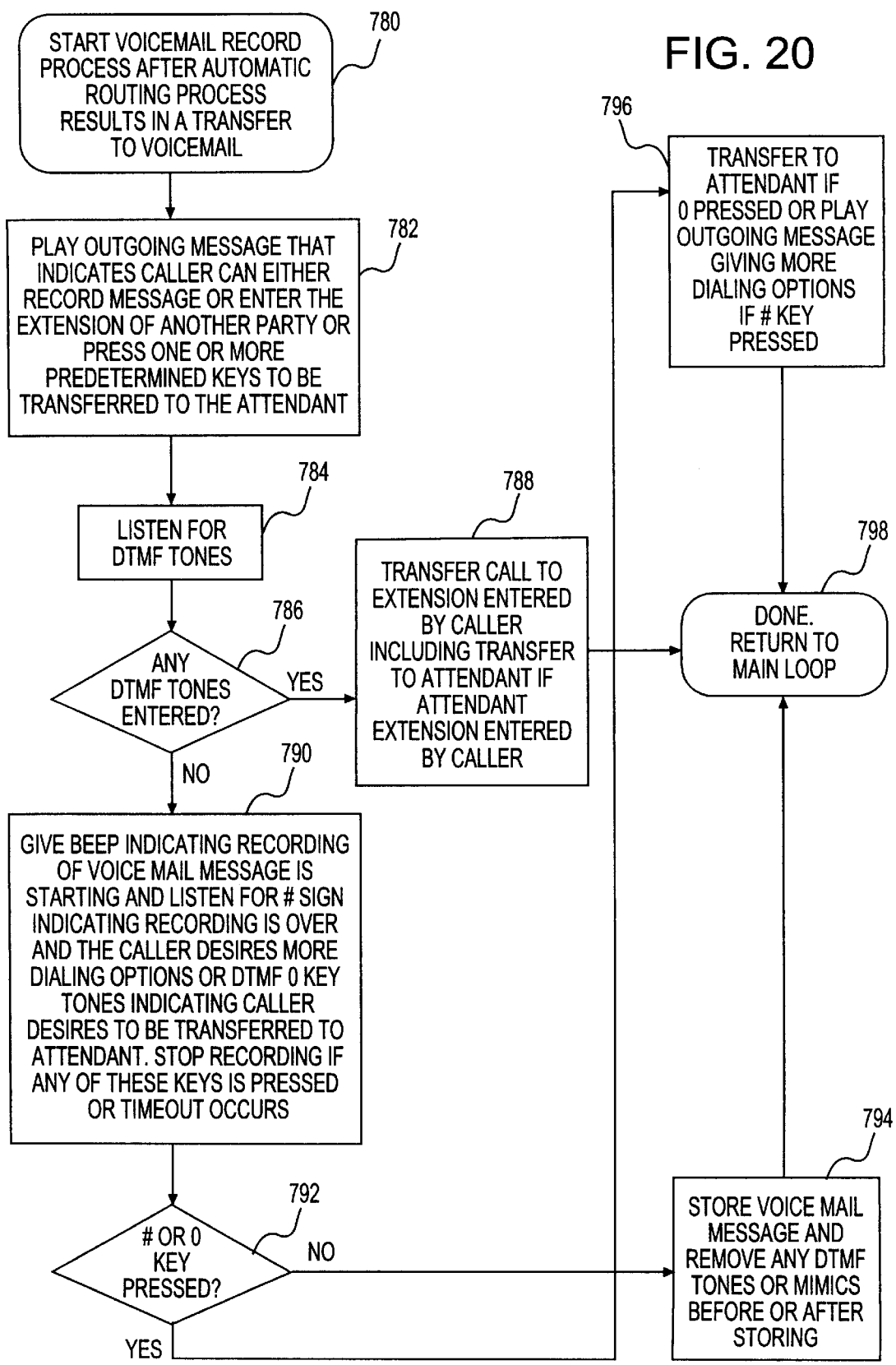
FIG. 20 is a flowchart of an alternative voice mail recording process wherein the user can abort the voice mail recording process and enter an extension to which the user desires transfer either before recording starts or by entering special DTMF commands during the recording to cause transfer to the operator or playing of an outgoing message giving the user more dialing options.

Another option, symbolized by the flowchart of FIG. 20, allows the caller to transfer to another extension if the result of the automatic transfer based upon caller ID is transfer into the called party's voice mail box. The process of FIG. 20 can be combined with the process of FIGS. 6 or 19A and 19B and FIGS. 8A and 8B as an alternative to the recording of a voice mail message process of FIG. 9 to generate several different alternative embodiments.

In the process of FIG. 20, the caller can interrupt the normal voice mail recording process by entering DTMF tones to force a transfer to another extension. If when a caller calls in and, she get the called party's voice mail, she can dial the extension number of the person she does want to talk to during the prefatory announcement of the voice mail. The process starts with block 780 representing a transfer into the voice mail recording process after the automatic routing process transferred the call to the called party's extension and there was no answer or the called party was on the phone and refused the second call. Block 782 represents the process of playing an outgoing message that informs the caller that she can either leave a message or enter the extension of another party or press one or more keys designated as a request to transfer to the operator or attendant. Step 784 represents the process of listening for any DTMF tones entered by the caller indicating transfer to the attendant or another extension is desired instead of leaving a voice mail message. Step 786 represents the process of determining if any DTMF tones have been entered. If DTMF tones identifying another party's extension or the extension of the operator have been entered, the process of block 788 is performed to transfer the call to the requested extension or to the attendant if that is what the caller requested. This can be done in the preferred embodiment by vectoring processing to step 200 on FIG. 8A, but, in other embodiments, it can be done in any other known way. Processing for this branch is then done, and processing returns to the main loop, as symbolized by block 798.

Figure 13:
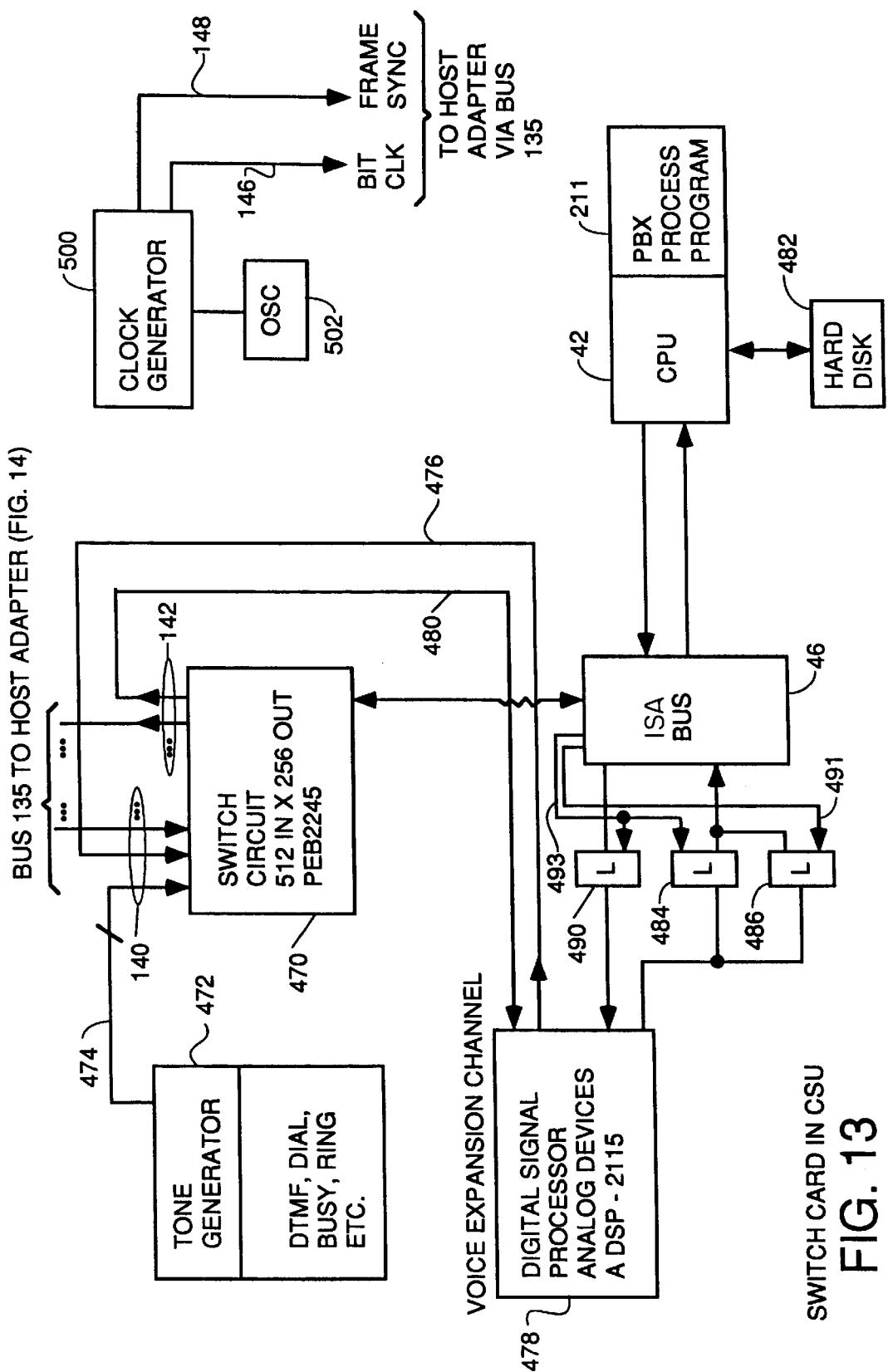
FIG. 13 is a block diagram for the switch card circuit 58 in FIGS. 1 and 7.

If test 786 determines that no DTMF tones were entered, step 790 is performed to order the switching circuit 470 on FIG. 13 to connect the timeslot dedicated to the voice mail recording beep tone to the CO line that has the incoming call. This indicates to the caller that voice mail recording is occurring. The caller can then record a voice mail message. If the caller inadvertently has waited until after the beep and finds herself in record mode and decides that she wants to be transferred to another party, she can press the # key to stop the recording and get more dialing options or she can press the 0 key and get transferred to the attendant. Block 790 represents the process of listening for the # key or 0 key DTMF tones during the voice mail recording interval. Voice mail recording is stopped if either the # key or 0 key is pressed or if a timeout occurs or the caller hangs up. In DTMF mimic recognition embodiments where the DTMF tones and mimics thereof are recognized during the recording process and eliminated before the voice mail message is stored on the CSU hard drive, the # or 0 DTMF commands will be recognized and erased, but they will still cause more dialing options to be presented or transfer to the operator, respectively.

Test 792 determines if the # or 0 key has been pressed. If not, the process of block 794 is performed to store the voice mail message on the CSU hard drive, and, if DTMF commands or mimics have not already been removed, optionally to remove them. Voice mail processing is then done for this branch and processing returns to the main loop.

If test 792 determines that the # or 0 key has been pressed, the process represented by block 796 is performed to transfer the call to the attendant if the 0 key was pressed or to play an outgoing message giving the caller more options if the # key was pressed. Processing is then done and returns to the main loop, as symbolized by block 798.

Figure 7:
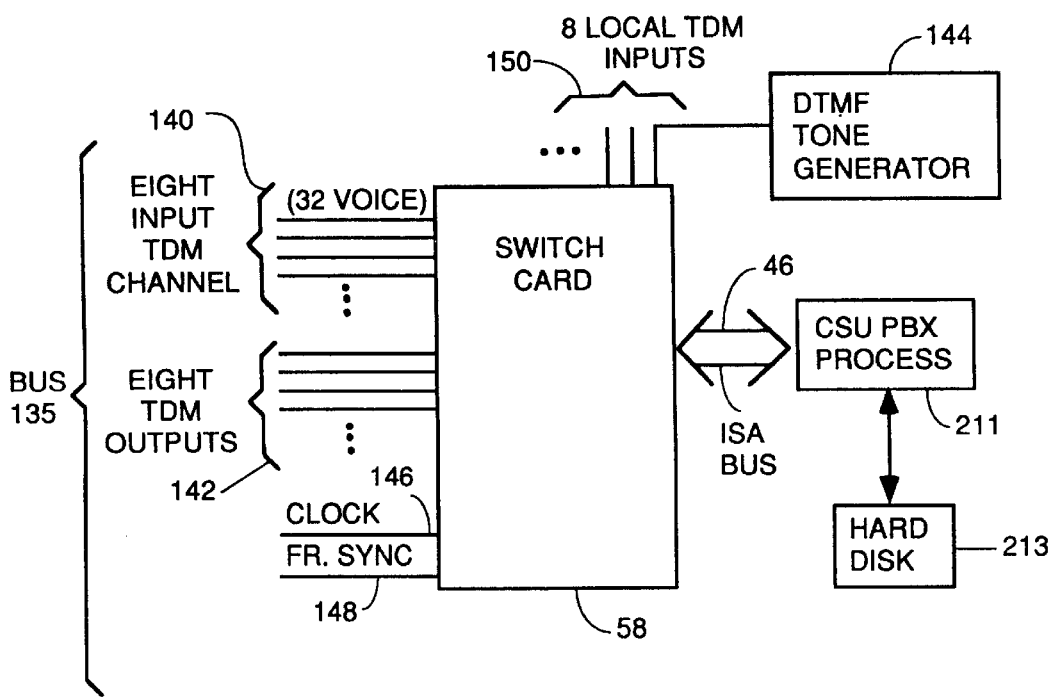
FIG. 7 shows a diagram of the inputs and outputs to the switch card.

Referring to FIG. 7, there is shown a diagram of the inputs and outputs to the switch card C in FIG. 2. The bus 135 is coupled to the switch card by eight time division multiplexed inputs 140 and eight time division multiplexed outputs and clock and frame sync inputs. A DTMF tone generator 144 of known structure is also coupled to the switch card to generate DTMF tones for dialing, ring signals, busy signals etc. used for user feedback on call progress or so-called ring back signals. Bus 135 also includes a 2.048 MHz bit clock signal on line 146 and a frame synchronization signal on line 148 which synchronizes all frames. The bit clock synchronizes each channel also. Each of the 8 TDM inputs and outputs can carry up to 32 channels of voice conversation simultaneously such that even if two PEUs are ganged together and all 8 CO ports are in simultaneous use, the total of 16 CO ports times two sides of every conversation makes 32 channels, all the data of which can be carried on the 32 timeslots of one of the 8 TDM inputs or outputs or both thereby still leaving a large capacity for internal conversations from extension to extension. The switch card also has 16 more input lines 150 each of which has 32 timeslots which are used for local communications and are not part of bus 135.

The switch card has a switch chip which can couple any timeslot on any input line to any timeslot on any of the output lines. The switch card is controlled by the CSU process to make the appropriate connection when appropriate in the transfer process.

Figure 8A:
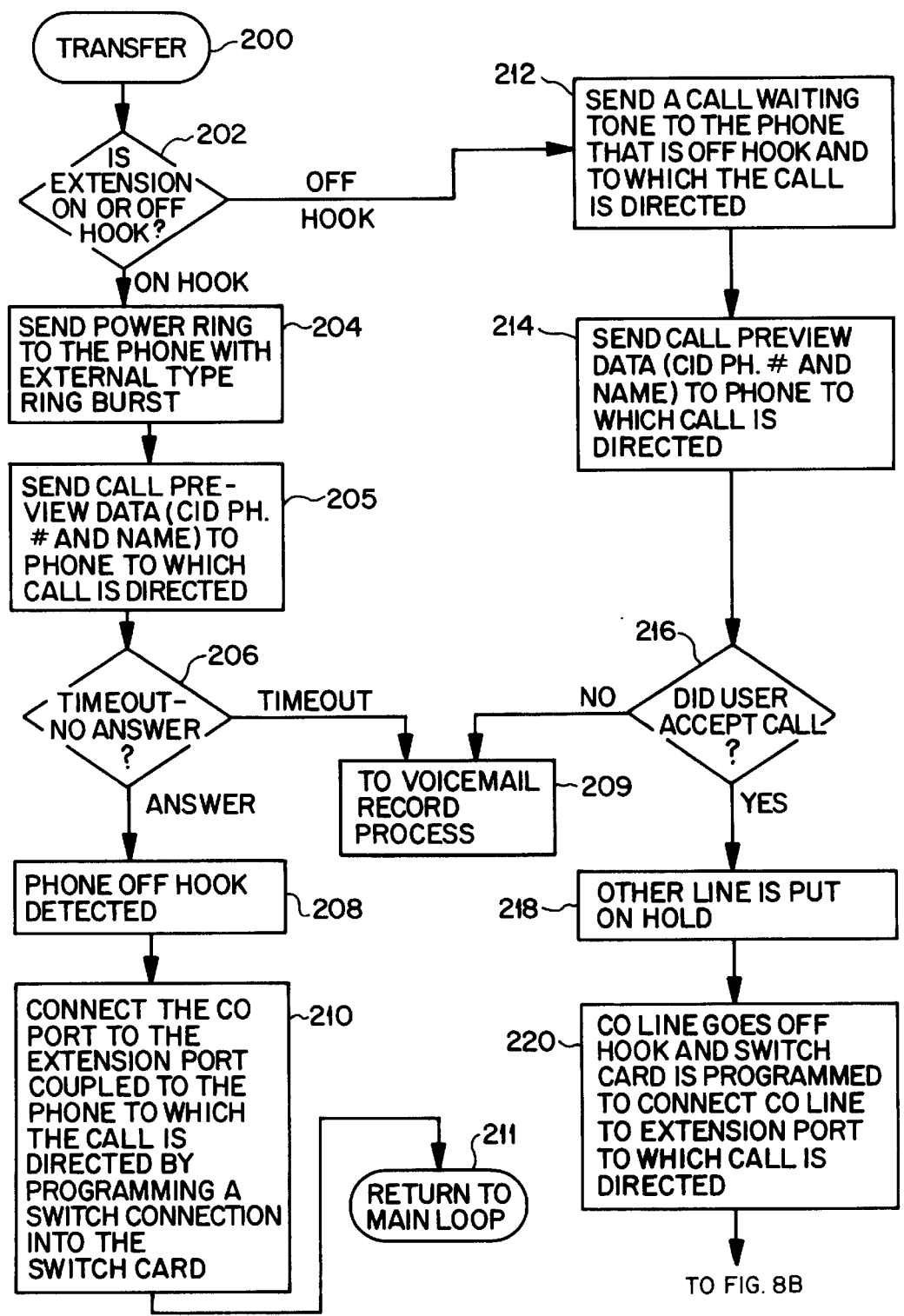
FIGS. 8A and 8B, taken together, comprise a flow chart of the process of transferring a call to the appropriate extension represented by block 132 in FIG. 6.
Figure 8B:
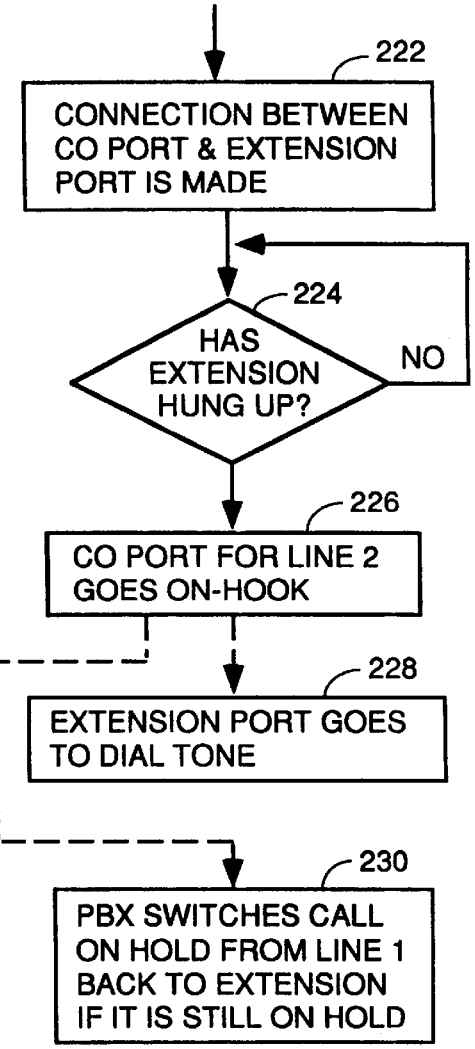

FIGS. 8A and 8B, taken together, comprise a flow chart of the transfer process represented by block 132 in FIG. 6. The process starts at block 200. Block 202 is a test to determine whether the extension is on or off hook. The extension-only ports are all on board B of the PEU. This board will be described in more detail later, but suffice it to say that it has a hybrid circuit for each port which senses the on or off hook status of the extension phone for that port. This status is converted to a digital logic level and transferred to the host adapter via bus 14. Typically, the CSU keeps a table in memory with the on-hook or off-hook status of each extension stored in it. Whenever a change occurs, the table is updated. The on-hook or off-hook status of each extension is included in one or more data bits of a serial stream of bits transmitted by a parallel-in, serial-out shift register on board B coupled to the hybrids assigned to all the ports to which that particular board B connects. Test 202 samples this status information from the table.

If the extension phone to which the call is directed is on-hook, the CSU sends a command to the host adapter 52 in FIG. 4 to generate a power ring tone command and send it to the extension phone to which the call is directed. The PEU receives the power ring tone command and generates a power ring tone and sends it out to the extension phone. This process is symbolized by block 204 in FIG. 8A.

Next, step 205 is performed to send call preview data in the form of the caller ID data of the caller to the phone to which the call is directed.

Step 206 in FIG. 8A is a test to determine if the external ring tone has been ringing for a time longer than the time out interval. If it has, the CSU PBX process 211 in FIG. 7 sends command packets to the switch card 58 to cause it to set up a connection between the CO port of the PEU and the voice mail box for the person assigned to the extension phone which did not answer, as symbolized by step 209. This is done by taking the data from the timeslot assigned to the CO port of the PEU upon which the call arrived on one of the eight TDM inputs 140 in FIG. 7 and placing it in whatever timeslot on one of the eight TDM outputs 142 that is assigned to that person's voice mail box. One of the TDM output lines 142 is coupled to a digital signal processor (not shown) on the switch card 58 in FIG. 7 which is programmed to record voice mail messages, remove any DTMF tones or DTMF mimics from the recording and store the data on a hard disk or other memory 213 by transferring it to the CSU process which stores it on hard disk.

Step 208 represents the process of determining that the called party answered by virtue of his or her phone going off-hook.

Block 210 represents the process of causing a connection between the PEU port coupled to the CO via the phone line on which the incoming call arrived to the PEU port to which the extension being called is connected. This process entails the steps of converting the incoming voice to digital data in the PEU, transmitting it to the host adapter and then to the switch card, ordering the switch card to take the data out of the timeslot in which the incoming data from the CO is arriving at the switch card and putting it in whatever timeslot is assigned to transmitting data to the extension phone to which the call is directed. The incoming data is then transmitted in the assigned timeslot over bus 14 to the PEU where it is converted to analog signals and coupled to the proper port to which the extension phone is connected and transmitted to that phone over bus 16. Voice signals in analog form coming from the extension phone are transmitted back to the PEU over bus 16, converted to digital data in the PEU and put in another timeslot assigned to return signals and transmitted via bus 14 to the host adapter and then to the switch card. The switch card takes this data out of the return timeslot and puts it into whatever timeslot is assigned to return data to the CO and transmits the data through the host adapter to the PEU over bus 14 where it is converted to analog signals on board C and coupled through board A to the port coupled to the CO via the telephone line on which the incoming call arrived. Processing then returns to the main program loop, as symbolized by block 211.

Returning to step 202, if the extension is off-hook, step 212 is performed to send a call waiting tone to the phone (the use of the term phone or extension or telephone here and in the claims should be understood as including TAPI compliant telephone equipment coupled to computers such as modems etc.) to which the call is directed that is off-hook. This is done by the CSU process sending a command to the switch card 50 commanding it to couple the DTMF tone generator 144 call waiting tone generated in a particular timeslot by tone generator 472 in FIG. 13 to the extension being called. This call waiting tone data is put into the timeslot dedicated to data being sent to the particular extension to which the call is directed. The data is then transmitted to the extension by the same process detailed above for sending voice data to the phone.

Step 214 is then performed to send call preview data to the extension. The call preview data is the caller ID number and name, if any, from the incoming call. If the extension is coupled to a Dash phone (Picazo Communications was formerly known as Dash) or to a PCOM card 26 or PCCL card 30, it is possible to preview a call on a display either on the Dash phone or on the display of the computer to see who is calling when a call waiting tone is heard. In step 216, the CSU process determines if the user accepted the call or not.

The process of step 216 is not done if the user has a regular phone since a regular phone cannot receive a second call when it is off-hook.

If the extension which received the call waiting tone is either a Dash phone or any other station equipment such as the PCOM or PCCL card, the process of accepting the call is different. Thus, test 216 has different processing branches which are intended to handle any situation with regard to which type of phone or station equipment is coupled to the extension. If the user is using a Dash phone, the user can preview the waiting call by pressing the line 2 button once. This brings up a display of the name and number sent in step 214. In the case of PCOM or PCCL, the user gives a preview command on his keyboard to bring up a display of the caller ID data. If the user decides to accept the call on a Dash phone, the line 2 button is pressed again. If the user decides to accept the call on station equipment such as a PC coupled to the extension line via the PCOM or PCCL cards, the user gives an accept command. These commands are stored in buffers in the Dash phone or station equipment. The CSU periodically polls all the extensions to determine which commands have been given. This is done by sending a command packet to the host adapter telling it to poll the extensions. The host adapter sends out inquiry packets to each extension via the bus 14 and the T1 and R1 digital lines of bus 16. When these inquiry packets arrive at each Dash phone or station equipment, the contents of the command buffer, if any, or a null response is sent back to the host adapter in a reply packet. The host adapter then stores the reply packet in memory and generates an interrupt to the PBX process. The interrupt service routine then reads the stored data and returns it to the PBX process. If the data shows that the user of a Dash phone has pressed line 2 twice or that the user of station equipment has given the command to receive the call, the PBX process proceeds to step 218.

Step 218 represents the process of putting the original line (hereafter line 1) on hold. This is done by connecting the port coupled to the CO by the telephone line carrying the original call to a source of a hold message such as music, promotions etc. This is done in the manner described above simply by the CSU central process sending a command packet or packets to the switch card instructing it to connect at least the outgoing timeslot for data to the CO on line 1 to a timeslot carrying the hold message data and transmitting this data to the PEU as described above for conversion back to analog signals and coupling to the CO port coupled to line 1.

Step 220 represents the process of the CSU central process (hereafter the PBX process) starting to connect the new call on line 2 to the extension that indicated it wanted the call in response to the call waiting tone. This is done by sending a command to the hybrid on board A in the PEU coupled to the port to which line 2 is connected. This command causes the hybrid to drive the CO line off-hook in step 220. Then, in step 222, the PBX process sends a command packet to the switch chip causing it to connect the timeslots of line 2 to the timeslots of the extension. These two switching events cause the following things to happen. When the CO port goes off-hook, the PEU then receives incoming voice signals and converts them to digital data and sends them to the host adapter via whatever timeslot on bus 14 which is assigned to incoming data. The PBX process may also optionally play a prerecorded message out on line 2 like, "One moment please while your call is being connected". This is done by accessing the digital data encoding the outgoing message and placing it in the timeslot assigned to outgoing data for the port coupled to line 2. The PBX process command packet to the switch chip causing it to couple line 2 to the extension causes data from the incoming and outgoing data timeslots for line 2 to be transferred from and to the outgoing and incoming timeslots, respectively, for the extension to which line 2 is to be connected, as those skilled in the art will appreciate. The other processing that occurs in the process of connecting line 2 to the extension is as described above.

The call then proceeds until it is terminated. When one conversant hangs up, the PBX process discovers that fact in step 224, and step 226 is performed wherein the PBX process sends a command to the hybrid on board A of the PEU port coupled to line 2 to cause it to set an on-hook condition for the line 2 tip and ring lines. Then, in step 228, the PBX process sends a command packet to the switch card 58 commanding it to connect the dial tone from the DTMF generator 144 to the extension phone that just hung up.

In an alternative embodiment, when the user hangs up or presses the line 1 button again or gives a "resume call 1" command on his or her station equipment, this fact is sensed by the PBX process, and line 1 is reconnected to the extension so that the call on line 1 can be completed, as symbolized by block 230.

Returning to step 216, if the user with his extension off-hook elects not to take the call, the PBX process sends a command packet to the switch chip to connect the timeslots of the incoming call on line 2 to the timeslots assigned to voice mail for that particular extension.

Figure 9:
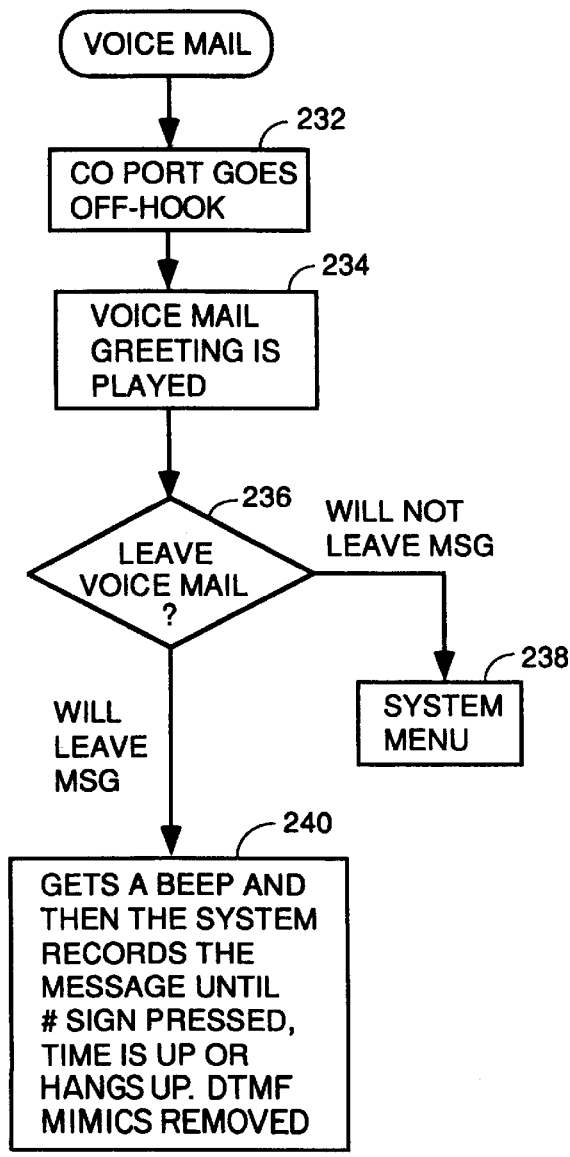
FIG. 9 is flow diagram of the process of recording a message in the voice mail box of a user.

Referring to FIG. 9, there is shown a flow diagram of the process of recording a message in the voice mail box of a user. This is the process that is performed when step 209 in FIG. 8A is performed. The process starts with block 232 where the PBX process sends a command to the hybrid connected to the CO port of the PEU connected to the port on which the incoming call arrived to go off-hook. The PBX process then sends a command packet to the switch card ordering it to connect the incoming and outgoing timeslots dedicated to the CO telephone line to the outgoing and incoming timeslots of the particular voice mail box dedicated to the person to whom the call is directed. The PBX process determines the voice mail box to which the message, if any, is to be recorded, by examining the timeslot in which incoming data regarding this voice mail is received. In some embodiments, the PBX process sends a command packet to the digital signal processor (DSP) via the ISA bus after routing an incoming call to voice mail in steps 206 or 216 of FIG. 8A telling it the connection on which to record any message. The switching by the switch card 58 in FIG. 7 establishes the connection to the voice mail box.

The PBX process then, in step 234, retrieves the appropriate voice mail greeting for the voice mail box of the person to whom the call is directed. The PBX process transfers the data to the DSP which puts the data for this message in the outgoing timeslot that is dedicated to the CO line on which the call arrived. The digital data is transmitted from the switch card through the hardware adapter to the PEU where it is converted to analog voice signals and coupled onto the tip and ring lines of the CO line to the caller via board A.

In step 236, the PBX process determines whether the person calling will leave a voice mail message. In some embodiments, this can be done by monitoring for DTMF tones entered by the user indicating a desire to leave a message or to be routed back to the main menu for more options. The manner in which the PBX process determines whether the caller will leave a message is in the prior art and is not critical to the invention. If the user will not leave a message, step 238 is performed where the PBX process uses the DSP on the switch card to play a prerecorded message giving the caller the system menu options. If it is determined that the user will leave a voice mail message, the PBX process executes step 240. There, the PBX process sends a command packet to the DTMF tone generator coupled to the switch card commanding it to generate a beep and sends a command packet to the switch card so as to cause the beep data from the DTMF tone generator to be coupled to the timeslots of the CO line of the incoming call to tell the caller that the system is ready to record the voice mail message. Then, after the beep, the PBX process sends a command packet to the switch card ordering it to connect the timeslots of the CO line having the incoming call to the timeslots of the voice mail box of the called person. The incoming voice signals are then converted to digital data on card C of the PEU and shipped on the timeslots dedicated to the CO port having the incoming call to the host adapter where they are transferred to the switch card. The switch card puts this data in the incoming timeslot of the appropriate voice mail box. The data is received by the DSP on the switch card and processed to remove any DTMF tone or DTMF mimics and then sent over the ISA bus to the PBX process 211 in FIG. 7 for storage on the hard disk 213. The manner in which DTMF mimics are removed is discussed in detail in the parent case, serial number 09/019,193, filed Feb. 5, 1998, the discussion of which is hereby incorporated by reference.

Referring to FIG. 10, there is shown a block diagram of the circuitry for one extension phone port on board B in the PEU 10 in FIG. 1. The extension phone or PCOM or PCCL station equipment is connected by bus 16 to a protection circuit 300. Analog tip and ring lines T and R carry the voice signals while digital T1 and R1 lines carry digital data for use by either a Dash phone or station equipment. The protection circuit is coupled to a power ring circuit which has an input 304 and an output 306. A Control input signal on line 304 tells the power ring circuit whether or not to ring the phone. An Off Hook During Ring status output on line 306 is a digital signal which is sent to the host adapter in the CSU via shift register 310 and bus 14 to tell it that the extension phone or station equipment picked up during the power ring. The digital Control input signal on line 304 is sent to the power ring circuit 302 via the status and control portion of bus 14 and shift register 312. The Control signals for each port on board B are sent from the CSU to shift register 312 in serial form and are output in parallel form to all the power ring circuits like 302 simultaneously. Upon activation of the Power Ring Control signal on line 304, the Power Ring circuit 302 generates a high power ring signal which is sent out to the extension telephone via the analog tip and ring lines to cause the extension phone to ring.

The Off Hook During Ring signal on line 306 is sent to the CSU, as are similar signals from the other ports, via shift register 310 and bus 14.

The power ring circuit is coupled to a 2-wire-to-4-wire conversion hybrid 314. This hybrid converts the bidirectional analog signals on pair 320 to unidirectional analog signals on TX pair 316 and RX pair 318. Pairs 316 and 318 are coupled to board C for digital-to-analog conversion and an analog-to-digital conversion, as appropriate depending upon the direction of flow of data. Hybrid 314 generates a single bit Off Hook Status signal on line 322 which is sent to the CSU via shift register 308 and bus 14. The Off Hook Status signal on line 322 tells the PBX process in the CSU that somebody has just picked up the extension phone whereas the On/Off Hook status signal on line 96 in the board A block diagram of FIG. 4 tells the PBX process when the CO telephone line has gone off hook.

Two digital lines T1 and R1 on bus 16 couple the extension phone or CTI station equipment to a conversion circuit 340. This circuit functions to take Digital Receive and Digital Transmit signals from the status and control bus on line 342 and 344, respectively, and puts them on the T1 and R1 lines with a known protocol and packet type. The data on lines 342 and 344 arrives from the host adapter of the CSU 40 via the Digital Com TX line 346 and Digital Com Receive line 348 within bus 14 on FIG. 1. These digital communication lines 346 and 348 are used to send and receive data to/from one port at a time using a multiplexer 350 and shift register 352. The shift register 352 has three parallel outputs 354 which are coupled to the select inputs of multiplexer 350. The shift register outputs 354 control which of the multiple Digital Receive inputs like line 342 received from the various ports is coupled to Digital Com Tx line 346 and which of the multiple Digital Xmit lines 344 from the various ports are coupled to Digital Com Receive line 348. The selection criteria data is sent to the shift register 352 via the DTX line 356 of bus 14 in serial form.

The DRX, DCK and XFER lines in FIG. 5 which form part of the status and control bus portion of bus 15 are used to monitor status of the following signals: Ring Detect status for CO line on line 84 in FIG. 4; On/Off Hook status for the extension phone or station equipment on line 322 in FIG. 10; Off Hook During Ring status for the extension phone on line 306 in FIG. 10; Port Type (CO or extension) on line 362 from shift register 360 in FIG. 10; tone identity and tone valid status for DTMF signals from all 16 PEU ports; Loop Current Present on line 97 in FIG. 4; Digital Ring signal on line 84 in FIG. 4 indicating when a CO line is ringing.

The DTX, DCK and XFER lines in FIG. 5 are used to control the logic level of the following signals thereby controlling certain events: CO line Off Hook on line 96 in FIG. 4; Power Ring Control on line 304 in FIG. 10 controlling power ringing of an extension or station equipment; and port selection for the Digital Com TX and Digital Com Receive lines 346 and 348 on FIG. 10.

The status and control portion of bus 14 is divided into bits, with one or more bits dedicated to a particular port. This allows the PBX process of the CSU to monitor digital status of each CO or extension port and to send digital control data to all CO and extension ports so as to operate the phone system.

In an alternative embodiment, the data on the digital communication lines 346 and 348 in FIG. 5 could be put in additional timeslots on the DTX and DRX lines such that the digital communication lines 346 and 348 could be eliminated while retaining the functions carried out by the data transmitted thereon.

Figure 11:
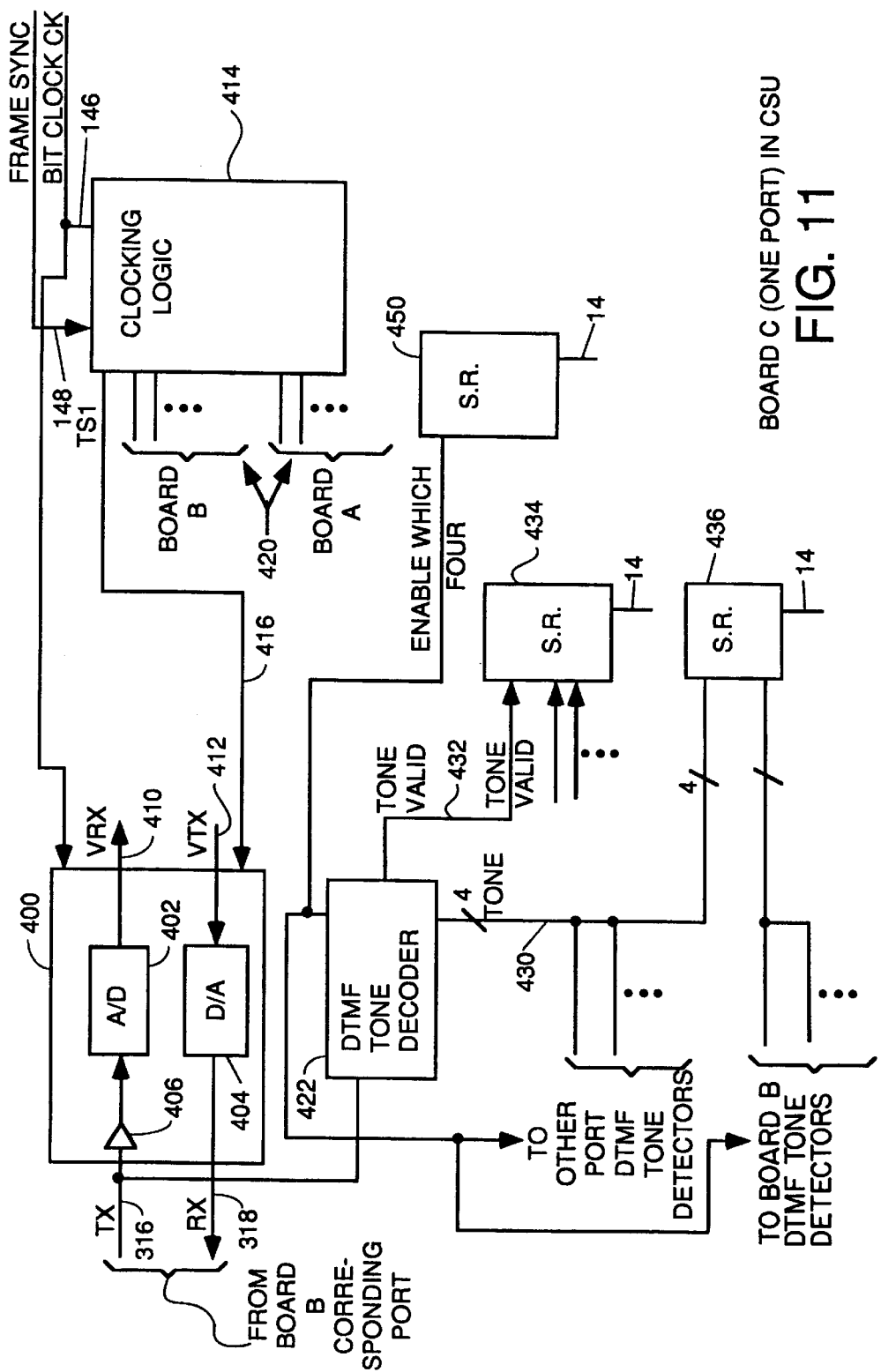
FIG. 11 is a block diagram of the circuitry on board C in the PEU for one port.
Figure 12:
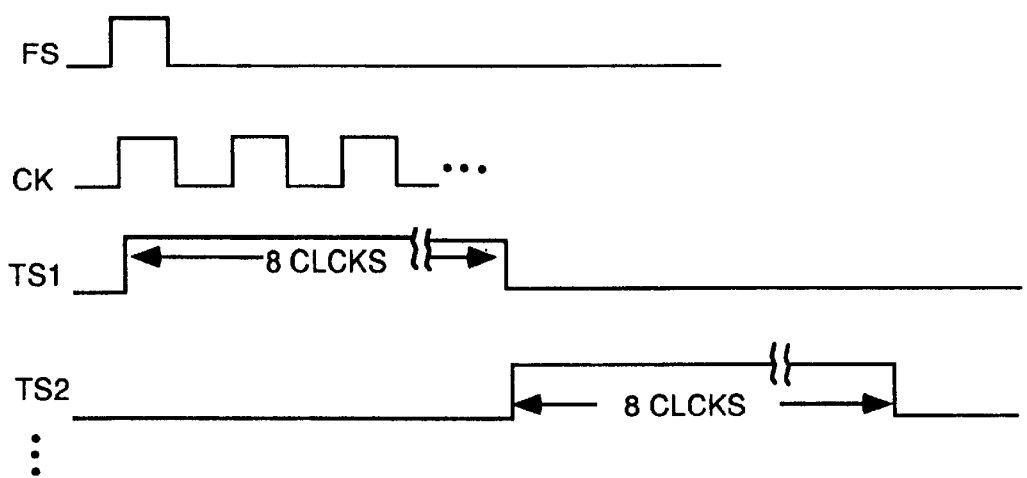
FIG. 12 is a timing diagram that shows the relationship between the frame synchronization signal FS and the bit clock signal CK and the various timeslot control signals TS1, TS2 etc.

Referring to FIG. 11, there is shown a block diagram of the circuitry on board C in the PEU for one port. Board C has a codec 400 with an analog-to-digital converter 402 and a digital-to-analog converter 404 and an amplifier 406. The codec 400 is coupled to the hybrid on board B or board A of the corresponding port by a TX line 316 and a RX line 318. The TX line is coupled to the A/D converter to convert the analog signal from amplifier 406 to digital data on a VRX line 410. The codec 400 is coupled to TDM multiplexing circuitry in the form of clocking logic 414 which is also shared by the codec circuitry for all the other ports as well. The function of the clocking logic is to use the bit clock signal on line 146 and the frame synchronization signal on line 148 to generate a control signals that tell each codec when to output its next byte of voice data on line VRX and when to input its next byte of input data on line VTX. The control signals define the timeslots dedicated to each port and tell the codec when their timeslot is happening. A TS1 signal on line 416 is the control signal that tells codec 400 when its timeslot is occurring and causes the codec to put the received data on VRX into the proper timeslot on bus 14 and to take data off bus 14 as the VTX data on line 412. The Bit Clock signal on line 146 also supplies a clock for the converters in codec 400 and for clocking logic 414. The timeslot control signals for the other ports are shown generally at 420. A timing diagram that shows the relationship between the frame synchronization signal FS and the bit clock signal CK and the various timeslot control signals TS1, TS2 etc. generated by clocking logic 414 is shown in FIG. 12.

Each port also includes a DTMF tone decoder 422 which takes the analog signals received on line 316 from the CO or extension port and decodes any DTMF tones in these signals. The identity of the DTMF tone is output as four bits on bus 430 which is shared by the other DTMF tone detectors for the other ports. Each DTMF tone detector has a tristate driver on its Tone output. A shift register 450 serves to enable the DTMF tone detectors in a polling sequence. The polling sequence data is received from the status and control portion of bus 14. The polling data loaded serially into shift register 450 is output in parallel form and enables only the DTMF tone detectors whose output data is to be read at any particular time.

The DTMF tone detector also outputs a Tone Valid signal on line 432 which is input to a shift register 434. The Tone Valid signals of all the other DTMF tone detectors for the other ports comprise the rest of the inputs for the shift register 434. This shift register has its serial data output coupled to the status and control portion of bus 14. The four bits of the Tone signal on bus 430 are loaded into a shift register 436. The Tone signals from the DTMF tone detectors of the other ports comprise the other inputs of the shift register 436, and its serial data output is coupled to the status and control portion of bus 14.

Referring to FIG. 13, there is shown a block diagram for the switch card circuit 58 in FIGS. 1 and 7. A switching integrated circuit (PEB 2245) 470 (hereafter "switch chip") performs the function of transferring data between timeslots coming in from the extensions to timeslots which are outbound for other extensions or the CO and vice versa. The switch chip 470 has 16 individual inputs that form a time division multiplexed input channel 140 and 8 outputs that form a time division multiplexed output channel 142. Each of the 16 input lines to the switch chip has 32 input timeslots, and each of the 8 output lines has 32 output timeslots. The switch chip can connect any timeslot to any other timeslot and can connect one timeslot to all timeslots for broadcasts such as paging.

A tone generator circuit 472 functions to generate DTMF tones, dial tones, busy tones, ring tones etc. These tones, in digital format, are coupled via bus 474 to one of the inputs of the TDM input channel 140 of the switch chip. The DTMF tone generator basically generates 32 different tones and puts each tone into a different timeslot on bus 474. Thus, the switch chip 470 can be controlled by microprocessor 42 running PBX process 211 via ISA bus command packets on bus 46 to select any tone needed at any particular time by taking data out of the timeslot on bus 474 dedicated to that particular tone. With regard to control of the switch chip 470 by the PBX process, ISA bus 46 is shown as a block with individual lines running out to the various circuits on the switch card. Each such individual line represents a connection to the address, data and control signals of ISA bus 46.

One of the switch chip input buses 476 is coupled to a digital signal processor 478 functioning as a voice expansion channel to add voice mail capability to the system. Likewise, one of the switch chip output buses 480 is also coupled to the DSP 478. The switch chip can therefore couple any CO line or extension port to the DSP 478 by coupling the appropriate timeslots on the input and output lines coupled to the appropriate port to the appropriate timeslots on the input and output buses 480 and 476. The DSP 478 is programmed to recognize DTMF tones or DTMF mimics during the process of recording voice mail messages and eliminate them either immediately or mark them and go back later and erase them. The voice expansion unit 478 functions to record voice data on any timeslot which is coupled onto its input bus 480 and record this data after the DTMF recognition processing on hard disk 482 via the CPU 42 and the PBX process 211. This is done by the voice expansion channel taking data out of the appropriate timeslot on its input bus 480 and processing it to remove any DTMF tones or mimics, and then formatting the data into ISA bus packets and transmitting it to CPU 42 and PBX process 211 via latch 484 in a DMA process for recording on hard disk 482. Latch 486 is a control latch. The latches 490, 484 and 486, are, in addition to being coupled to the data path of the ISA bus, are also coupled to address and control signals of the ISA bus, as represented by lines 491 and 493. The PBX process takes the raw voice data transferred in this way and attaches header information and records it in a file on the hard disk. The voice data in the timeslots on buses 480 and 476 is just raw voice data since each port has a dedicated transmit timeslot and a dedicated receive timeslot so no header information is needed when connecting the bytes in these timeslots to assigned timeslots on buses 480 and 476.

The DSP 478 also functions to play prerecorded message data from the hard disk 482 such as voice mail announcements and put them onto its output bus 476 for coupling through the switch chip 470 to the CO telephone line or some extension. The PBX process aids performance of this function by requesting access to the file on the hard disk having the prerecorded message announcement data. The data is then moved off the hard disk and put into the memory of the CPU 42 and then moved through the ISA bus interface 46 and latch 490 via DMA transfer into the memory of DSP 478 as ISA packets. DSP 478 takes the packetized data out of its memory and reassembles the data into a format suitable for transmission to the switch chip in the appropriate timeslot on bus 476 in the proper sequence. The switch chip then takes the data out of the assigned timeslot from the DSP and puts it on the timeslot assigned to the destination CO or extension port. This data then flows over bus 135 in FIG. 1 to the host adapter 52. At the host adapter, the data from the appropriate timeslot on the appropriate output line from the switch chip is multiplexed into the appropriate timeslot on bus 14 and sent to board C of the PEU 10. There, it is received on the VTX line 412 on FIG. 11 for the appropriate port and converted to analog voice data and transmitted out on the RX line 318 for the appropriate port. Assuming the appropriate port is an extension port, from the RX line 318, the voice signal travels to the hybrid 314 on FIG. 10 for the appropriate port via bus 137 in FIG. 2 and is then sent out to the extension phone or station equipment via bus 16 in FIG. 1.

The process to record a voice mail message is the reverse of the above described process except that the DSP 478 finds any DTMF tones or mimics in the incoming data and eliminates them before sending the file to the PBX process for writing to the hard disk. The DSP 478 has the capability to record multiple voice mail messages on different timeslots on buses 480 and 476 simultaneously.

The switch card also includes watchdog timers (not shown) to reset the system if the software crashes, and a master clock generator 500 driven by an oscillator 502 to generate the bit clock signal on line 146 and a Frame Sync signal on line 148.

Figure 14:
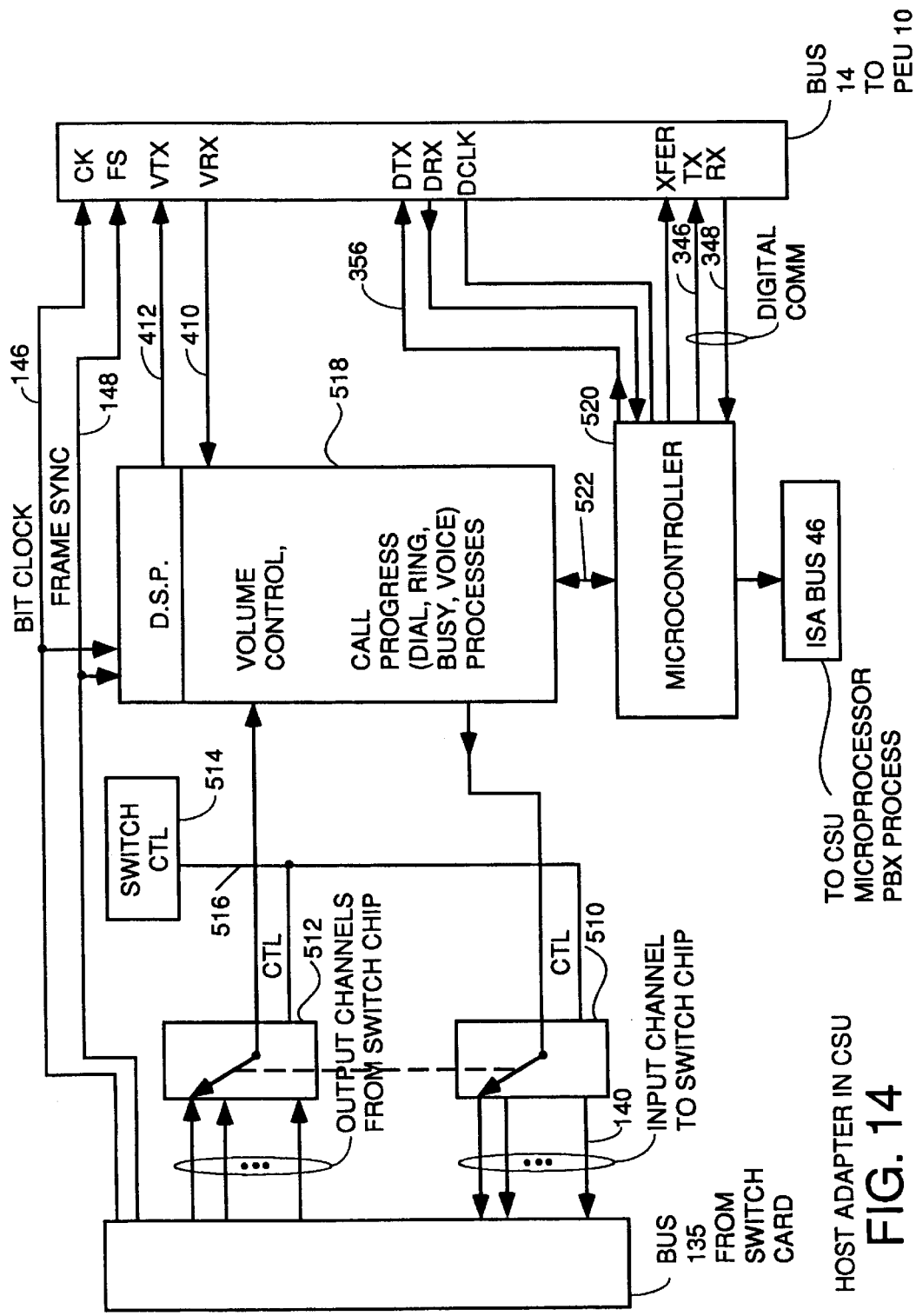
FIG. 14 is a block diagram of the host adapter in the CSU.

Referring to FIG. 14, there is shown a block diagram of the host adapter in the CSU. The host adapter is coupled to bus 135 such that seven of the eight input channels 140 of the switch chip on FIG. 13 are coupled to a switch 510, and seven of the eight output channels of switch chip 470 are coupled to switch 512. Switches 512 and 510 work as a pair under the control of switch control circuit 514 and a control signal on line 516. The function of the switches 512 and 510 is to pick one input channel and one output channel of the switch chip for coupling to a digital signal processor 518. Since each port has one channel comprised of a dedicated input timeslot and a dedicated output timeslot and since these timeslots must be on different input and output channels of the switch chip, the purpose of the switches 512 and 510 is to make sure the correct input and output channels of the switch chip for the particular conversation being processed are coupled to the DSP 518. Timeslot assignments are such that port 1 is on channel 1, timeslot 1 and port 2 is on channel 1, timeslot 2 all the way up to port 32 which is on channel 1, timeslot 32. Port 33 is on channel 2, timeslot 1. Each PEU is 16 ports for a total of 32 timeslots assigned to it. One host adapter can handle two PEUs because the PEUs can be chained together by an extension of bus 14.

The DSP 518 is programmed to perform various functions for each conversation in the 32 input and output timeslots to which it is connected. Those functions include volume control, call progress monitoring etc. The call progress monitors involves determining whether voice data is present, whether there is a dial tone, ring signal, busy signal etc. The processed data is transmitted to and received from the PEU via the voice data lines VTX and VRX, 412 and 410.

The Bit Clock signal CK on line 146 and the Frame Sync signal FS on line 148 generated on the switch card simply pass from bus 135 to bus 14 for transmission to the PEU. These two signals are also coupled to the DSP 518.

A microcontroller 520 loads the program into the DSP 518 at powerup time and sends volume control commands to the DSP via bus 522 and receives call progress updates from the DSP. The volume control commands are static commands and do not currently implement automatic volume control. The microcontroller 520 is also coupled to the status and control lines DTX, DRX, DCLK, XFER, TX and RX and Digital Comm lines 346 and 348 of bus 14. The microcontroller 520 drives the control signals on the control lines of bus 14 in accordance with commands received from the PBX process 211 in FIG. 7 via command packets received over the ISA bus 46. Likewise, status information received over the status monitoring lines of bus 14 is formatted by the microcontroller 520 into ISA bus packets and sent via ISA bus 46 to the PBX process 211. If caller ID information or other digital data for the user interface needs to be sent to the phones themselves, the PBX process sends that data to the microcontroller in ISA bus packets which depacketizes them and sends the data to the phones via the Digital Comm lines 346 and 348.

Figure 15:
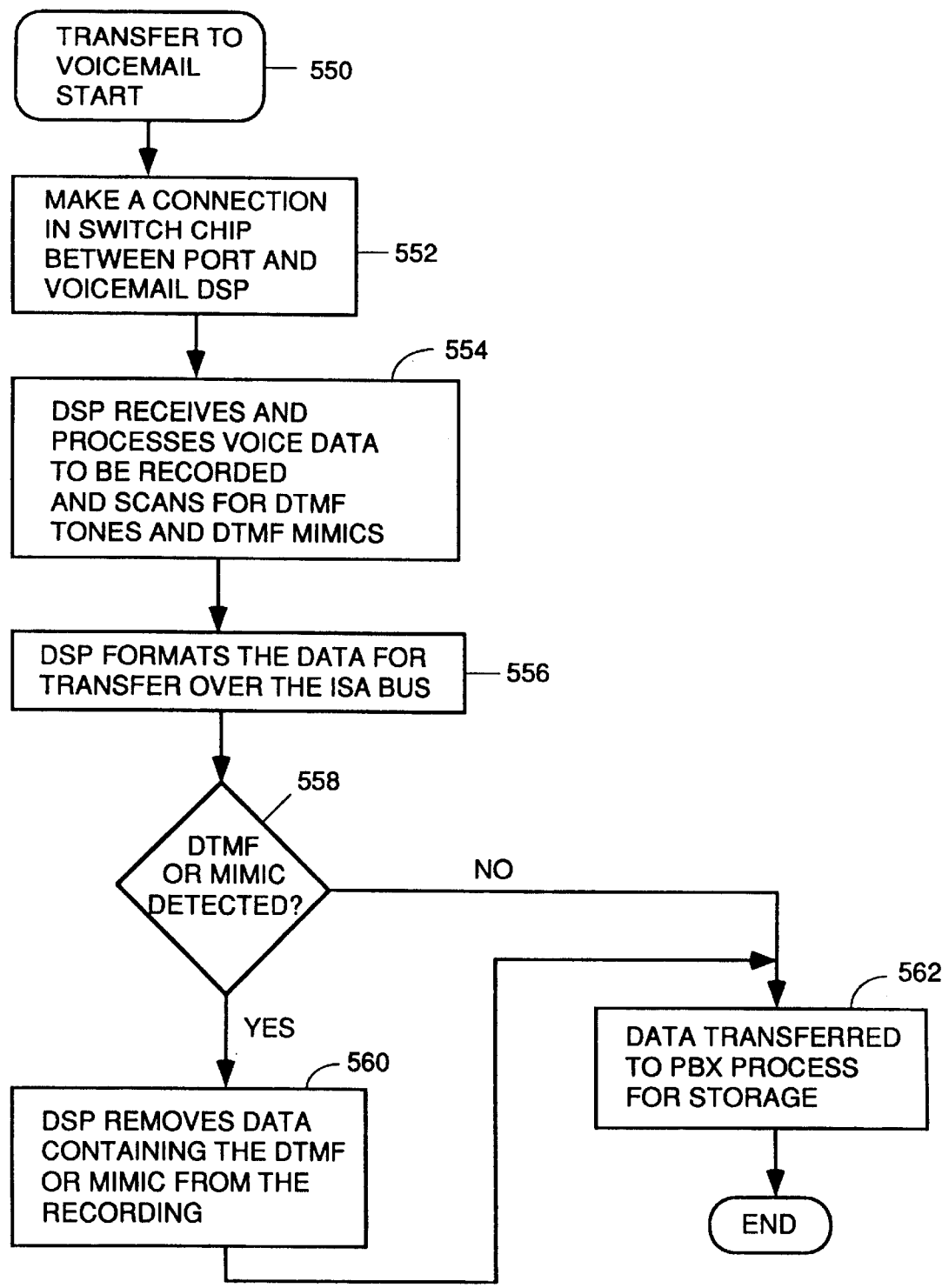
FIG. 15 is a flow diagram of the preferred voice mail recording process wherein DTMF tones or mimics are detected during the recording process and removed from the recording.

Referring to FIG. 15, there is shown a block diagram of the preferred voice mail recording process. The process starts at block 550 which symbolizes the start of the voice mail recording process. The invention of scanning for DTMF tones or mimics in data to be recorded as a voice mail message is intended to be a stand alone invention and can be employed in any telephone or voice mail/answering machine system. As such, it does not depend upon the particular hardware disclosed herein or the other processes disclosed herein regarding how that hardware works to perform various of the other functions described. The telephone system described herein is intended to be only one example of the many systems in which the invention can be usefully employed. Any system which performs the functions of scanning for DTMF tones or mimics in the data to be recorded as a voice mail message or which has already been recorded as a voice mail message and then either removes the data containing the DTMF tone or mimic or alters it so that it will not be recognized as a DTMF tone upon playback will fall within the genus of the invention. The removal or alteration can be performed either in real time as the data is being recorded or by marking the portions of the recording that have to be further processed and returning later and either removing the data or altering it. In the particular phone system described herein, the invention is employed as follows. In block 552, the PBX process sends commands to the switch card via the ISA bus commanding it to make a connection between the time slots dedicated to the port having the incoming call and the DSP 478 on FIG. 13. This connects the digital data to be recorded as a voice mail message to the DSP and data starts to flow over bus 480 to the DSP. In step 554, the DSP receives and processes the voice data to be recorded as a voice mail message and scans each block of data to be recorded for the presence of DTMF tones or DTMF mimics.

The term "DTMF tone" as used in the drawings, herein and the claims is to be understood as a pair of tones having characteristics such that they would be interpreted as a DTMF command. The term "DTMF mimics" as used in the specification and drawings herein and in the claims means signals which are actually voice but which contain sufficient energy at certain Fourier spectral components and with certain DTMF characteristics as to the amount of power in each component and the relative amplitudes between the components to be mistaken in a DTMF tone detector as being a DTMF tone or command.

In an alternative embodiment, the process of block 554 can also be performed on data already recorded as a voice mail message by requesting a read of the data on the hard disk recorded as a voice mail message. In this alternative embodiment, step 556 may not need to be done since the data will arrive from the PBX process 210 already in ISA bus packets. The manner in which the DTMF tones or mimics are detected in step 554 is not critical to the invention, and any prior art method of detecting the presence of a DTMF tone or mimic will suffice to practice step 554. One way of doing the DTMF tone scan is to perform a Fast Fourier Transform in the DSP. This results in an array of outputs, each of which defines the energy content in one frequency bin, all these outputs taken together defining the Fourier spectrum or energy content at each frequency. The spectrum can then be analyzed to determine if there is sufficient energy at the two frequencies of any of the known DTMF commands to be construed as a DTMF command regardless of whether the DTMF command is real or a mimic. DTMF commands are twin tones, one at any of four frequencies in a low band and the other of which is any of four frequencies in a high band. The various combinations of tones from the low band and high band define all the different keys on a standard telephone keyboard.

Step 556 represents the process of formatting the data to be recorded for transfer over the ISA bus to the PBX process. This is a packetization process to break the data into bytes for placement in ISA bus packets and suitably identifying the data with regard to which port from which it came such as by use of header data. Obviously, in systems where there is sufficient memory at the location of the processing where the DTMF screening happens, and the voice mail data is stored there, there is no need for step 556 of formatting for transfer over the ISA bus because there is no transfer.

Step 558 is a test to determine if any DTMF tone or mimic was found in step 554. If there was, then processing proceeds to step 560. If not, processing proceeds to step 562. Step 562 is a step of transferring the data to the PBX process for storage on a hard disk. Obviously, in species within the genus of the invention where it is not necessary to transfer the data elsewhere for storage, step 562 is simply the process of storing the data of the voice mail message in memory.

Step 560 represents the process of removing or altering the DTMF tone data so that, upon playback, no DTMF tones or mimics will be detected by any DTMF detector which is active during the playback. In the preferred embodiment, step 560 is a process of removing the DTMF tone or mimic data in real time from the data stream as it is detected, and this is done by erasing all data in which the DTMF tone or mimic may be found, and then storing the remaining data in memory in step 562. An alternative embodiment is to put easily found markers in the data stream marking the beginning and end of the data section where a DTMF tone or mimic was found, recording the data in step 562 and returning to the recording and processing the data between the markers by either removing it altogether or filtering it to remove one of the DTMF tones and then re-recording the filtered segment over the segment containing the DTMF tone. Step 560 also represents the process of filtering any segment of data containing a DTMF tone or mimic by determining the frequency of one of the pair in the DTMF tone, and then passing the data through a digital filter to remove just that one frequency in just the offending segment to disable the DTMF tone. This does less damage to the voice mail message.

Although the specific example of FIG. 15 shows the invention in operation in a voice mail record process based upon digital data, the genus of processes employing the invention can just as effectively carry out the functional requirements of the invention in analog circuitry.

Figure 16:
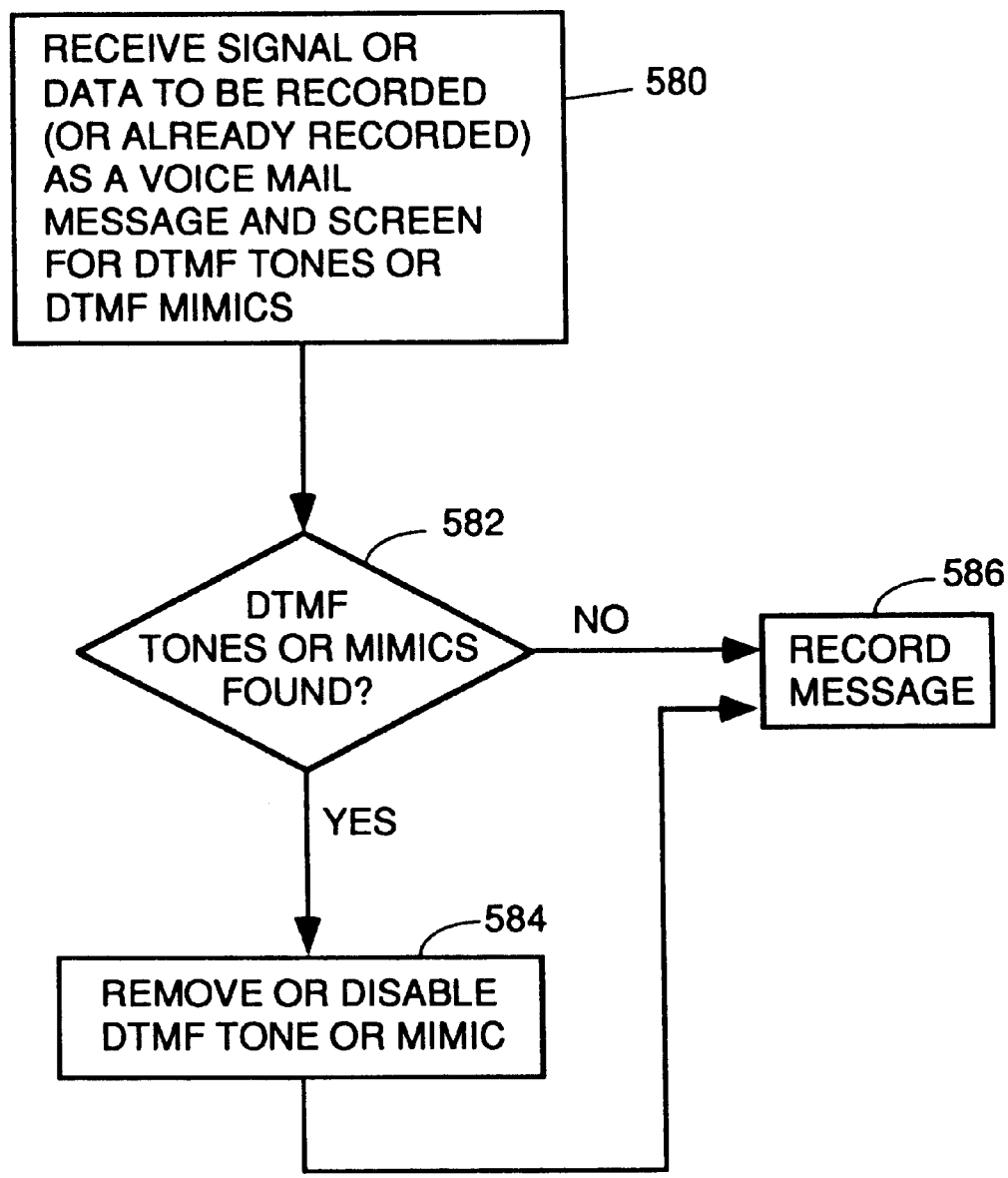
FIG. 16 is a flow diagram representing the shared characteristics of all species that do DTMF tone and DTMF mimic removal.

FIG. 16 represents the DTMF mimic removal process carried out by the broad genus of the invention. In step 580, the signal or data to be recorded as a voice mail message (or a signal or data already recorded as a voice mail message) is received and scanned for DTMF tones or mimics. in step 582, a determination as to whether DTMF tones or mimics were found in step 580. If so, step 584 removes or disables the DTMF tones or mimics either in real time before recording or by marking the recording and going back to remove and disable the DTMF tones or mimics later. The removal or disabling can be by any of the methods described above for FIG. 15. Assuming step 584 is a real time removal or disabling process, then step 586 is performed next to record the message in either analog or digital form. Step 586 is also performed directly from step 582 if no DTMF tones or mimics are found.

Figure 17:
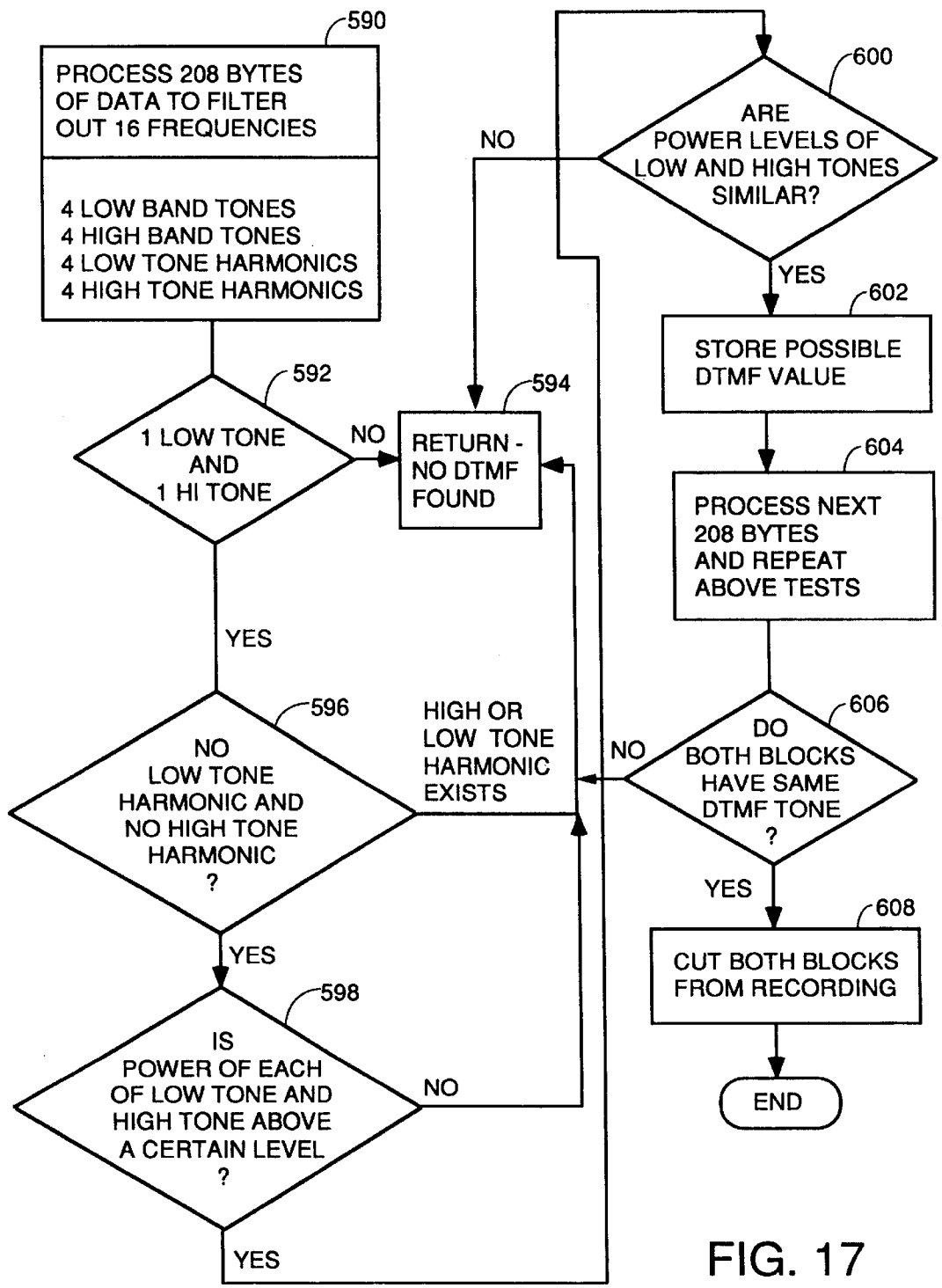
FIG. 17 is a flowchart of the preferred embodiment of screening for DTMF tones and eliminating the data.

Referring to FIG. 17, there is shown a flowchart of the preferred embodiment of screening for DTMF tones and eliminating the data. The process of FIG. 17 represents, in more detail, the processes carried out by blocks 554, 558 and 560 in FIG. 15. Since DTMF tones are only two pure tones, one from a group of four pure tones in a low frequency band and one from a group of four pure tones in a high frequency band, and there are no harmonics present in true DTMF commands, the complexity of a full Fast Fourier Algorithm to analyze energy content at all frequencies is not required. In fact, the preferred method is to adapt a prior art DTMF detection algorithm published by analog devices to the application. This algorithm is a digital filtering algorithm that looks for energy content at each of 16 frequencies. Those 16 frequencies are the four frequencies of the low band, the four frequencies of the high band and the first even harmonic of each one of these eight low and high band frequencies. The reason that the energy content of the harmonics is checked is because when a human voice has energy at a DTMF low band tone or high band tone, there is also usually energy at the first even harmonic thereof. So knowledge of the harmonic energy at each of these eight possible harmonics is useful in distinguishing true DTMF tones and mimics that cannot be ignored (those with no harmonic energy at the 8 harmonic frequencies and sufficient energy at a low band and a high band frequency) from mimics that can be ignored (those with energy at the harmonics of the low and/or high band frequency).

The first step in FIG. 17 is represented by block 590. This block represents the process of running a digital filter algorithm on a block of 208 bytes 16 times at 16 different frequencies. Each pass outputs data indicative of the amount of power at one frequency. The 16 frequencies so analyzed are listed on the bottom half of box 590. They are: each of the four possible frequencies in the low band of DTMF frequencies; each of the four possible frequencies in the high band of DTMF frequencies; each of the four first even harmonics for the four low band tones; and, each of the four first even harmonics for the four high band tones. These processes of running the digital filter algorithms are the screening process of block 554 in FIG. 15.

After the screening, a test symbolized by block 592 is performed to determine if one low tone and one high tone was found. This test determines if there is energy at any level in one of the DTMF frequencies in the low band and one of the DTMF frequencies in the high band. If there is no energy in one of the low band frequencies and one of the high band frequencies, in this block of data, there cannot be a DTMF command therein, so processing vectors to block 594 which represents whatever processing is performed to record the block of data as a voice mail message. In the case of the example of FIG. 15, that processing is represented by block 562.

If there is power in one low tone and one high tone, the first screen is passed, and the second screen is performed, as symbolized by test 596. The second screen is to determine if there is or is not power in the harmonics of these two tones found in test 592. In step 596, a determination is made as to whether there is power in either the first even harmonic of the low band tone or the first even harmonic of the high band tone. If power exists in the harmonic of either the low band tone or the high band tone, then the data does not contain a true DTMF tone since true DTMF tones have no energy in their harmonics and is probably a human voice. When there is power in either harmonic, then processing is vectored to block 594 to return no DTMF command having been found.

If no power was found in either harmonic, another test, symbolized by block 598, is performed to determine if the tones are loud enough to be true DTMF tones. In step 598, the power of each of the low band and high band tones is compared to a minimum threshold criteria for power. If either tone has insufficient power to exceed that threshold, then it is not a DTMF tone, and processing vectors to block 594. Assuming that each tone has sufficient power to exceed the power criteria, the last criteria test is imposed, represented by block 600. This test determines if the power levels of each of the low tones and high tones is roughly similar. If not, then it is not a true DTMF tone, and processing vectors to block 594 to return, no DTMF tone having been found. If the power levels of both tones are roughly similar, then the two tones may be a valid DTMF command, and step 602 saves the possible DTMF value.

A possible DTMF command will not be thrown out unless the same command is found in two consecutive blocks of data to eliminate momentary flashes in energy in a human voice from being mistaken as DTMF commands that need to be erased. Thus, step 604 is performed to process the next 208 bytes of data. The tests of blocks 590, 592, 596, 598 and 600 are repeated on this second block of data. If the tests yield the same possible DTMF tone or command, as determined in test 606, then the algorithm concludes that a legitimate DTMF command has been found, or at least a human voice segment which is indistinguishable from a true DTMF command (a mimic). If a true DTMF command or a mimic has been found, both blocks of data are erased in block 608. If test 606 determines that the same DTMF command was not found in both blocks of data, then a true DTMF command or mimic has not been found, and processing vectors to block 594.

Note that the processing of FIG. 17 could also be performed on the data of an already recorded voice mail message just as easily, and such processing is an alternative embodiment.

Figure 18:
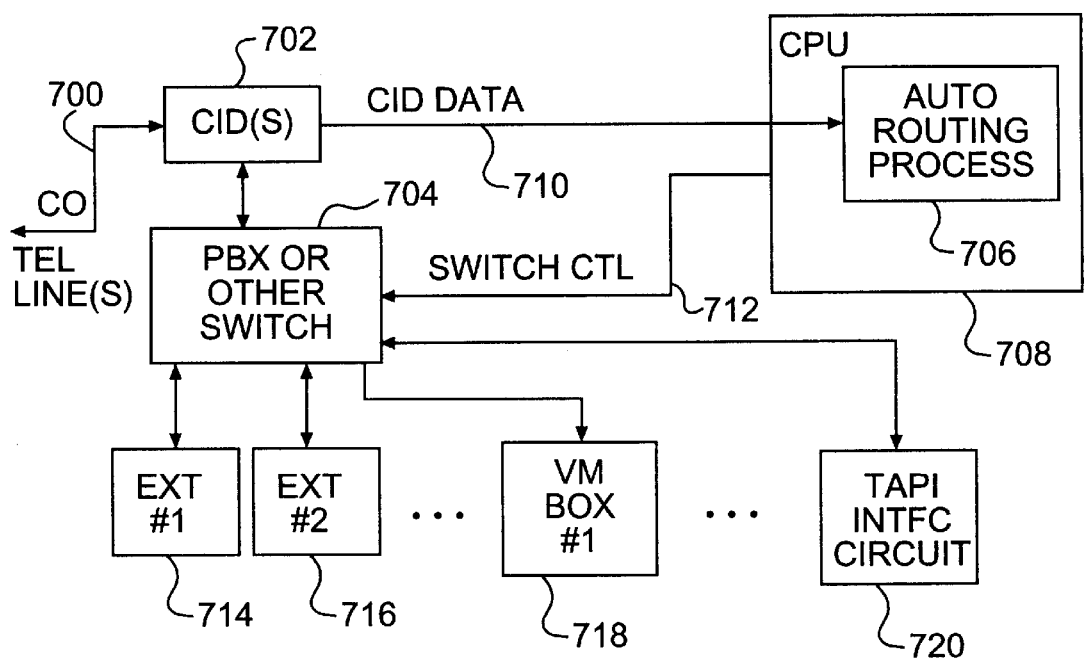
FIG. 18 is a block diagram of a generic multiextension telephone system in which a caller ID based autorouting process can be practiced.

Referring to FIG. 18, there is shown a block diagram of a generic multiextension telephone system in which the autorouting process of the invention can be practiced. One or more incoming telephone lines 700 are coupled to one or more individual stand alone caller ID detectors 702. Alternatively, a caller ID detection chip for each CO line 700 may be included within the circuitry in a PBX or other switch 704. The caller ID circuits detect caller ID data transmitted with incoming calls and transmit that caller ID data to an automatic caller ID routing process 706 in execution in a computer 708 via bus 710. The automatic routing process uses the caller ID data as a search key to search a routing table stored in computer 708 to find the extension or voice mail box or TAPI interface circuit the person or device having the caller ID of the incoming call usually calls. When a match is found, the autorouting process sends back switch control data via bus 712 to the PBX or other conventional switching circuit 704. The PBX or other conventional switching circuit then connects the appropriate telephone line from the CO to the appropriate called device as dictated by the switch control data on bus 712. The called devices are represented by extension telephones 714 and 716 and voice mail recording device 718 and TAPI interface circuit 720.

An alternative embodiment to the automatic routing process based upon caller ID that allows the caller to interrupt the automatic routing process and force transfer to another extension or to an attendant is symbolized by the flowchart of FIGS. 19A and 19B. In the process of FIGS. 19A and 19B semiautomatic routing of an incoming telephone call sometimes by caller ID and sometimes by DTMF commands issued by the user is implemented in a way such that assistance from an attendant of the telephone system called can also be requested if the need arises. The process starts at block 750 and proceeds to block 752 where an incoming ring signal is detected in the manner described elsewhere herein for the preferred embodiment or by any known embodiment. In step 754, the presence or absence of caller ID data in the ring signal is determined in the manner described in FIG. 6 or in any other known manner. If caller ID data is detected, it is transferred in step 754 to an automatic routing process carried out on a computer controlling the telephone system such as the CSU 40 in FIG. 1 but which could be a digital signal processor programmed to do all the functions described herein for the preferred embodiment necessary to receive and route telephone calls and record voice mail messages. Step 756 represents the process of automatically answering the telephone call. This can be done, for example, by sending an on/off hook control signal such as the signal on line 96 in FIG. 4 to a hybrid such as hybrid 86 coupled to the telephone line from the CO on which the telephone call is arriving to cause the CO switching equipment to see an off-hook state.

Next, step 758 is performed to determine if caller ID data was detected. This determination will control which of two outgoing messages is initially played to the caller. If no caller ID data was detected or if the caller ID data was blocked, the process of block 760 is performed to play a first outgoing message. This message requests the caller to enter the extension number of the party the caller wishes to speak to or to press a combination of one or more keys on the caller's touchtone phone keypad indicating the caller wishes to speak to an attendant such as in cases where the caller does not know who he or she needs to speak to. The outgoing messages described herein can take the form of digitized voice messages that are recalled by the DSP478 in FIG. 13 from the system hard drive and sent though switch circuit 470 to the appropriate digital-to-analog converter coupled to the CO telephone line having the incoming call.

If caller ID data was detected, test 758 vectors processing to the process of block 762. There, a second outgoing message is played to the caller telling the caller that the call will be automatically transferred to the extension the caller usually calls unless the caller presses a predetermined key or combination of keys (or, in some embodiments, any key) within a predetermined time interval the duration of which is made known to the caller.

After the process of block 762, test 764 determines whether the caller pressed the key or keys indicating a desire not to be automatically transferred to the person they usually call. If such a key was pressed, the process of block 766 is performed to play outgoing message #1 requesting the caller to enter the extension number the caller wishes to speak with or the extension assigned to the attendant. Then the process of block 768 is performed to monitor the incoming telephone line for DTMF tones entered by the caller.

When the DTMF tones indicating the desired extension are received, the microprocessor implementing the process of FIGS. 19A and 19B issues commands to cause transfer of the call to the extension indicated. However, if the extension entered is invalid or the key or keys assigned to transfer to the attendant's extension are pressed, commands are issued to transfer the call to the attendant, all as symbolized by block 770. Then processing returns to Start at block 750, as symbolized by transfer block 772.

Returning to the consideration of test 764, if there was no keypress during the timeout interval after outgoing message #2 was played indicating that an automatic transfer is desired based upon caller ID data, the process of block 774 is performed. That process uses the caller ID data as a search key to search the routing table to look up the extension number the caller normally calls, if any.

Next, test 776 determines if there was a match or partial match in the routing table on the caller ID. If there was, the process of block 778 is performed to issue commands to transfer the call to the extension or voice mail box to which the caller ID data is mapped in the routing table. In other embodiments, the search key will be used to search a routing table to find a predetermined destination for the call based on the CID, the predetermined destination taking the form of a PBX internal telephone extension, an extension external to a PBX or voice mail box or boxes or voice or radio paging devices associated with the caller ID data for use in routing the call. After the predetermined destination is found from the routing table using the CID, a command will be generated to automatically transfer the call to the predetermined destination. This transfer process can take the form of the process described with reference to FIGS. 8A, 8B and 9 herein or. by any other process in other telephone system structures. Optionally, any DTMF tones or mimics are removed from the data of the voice mail message either before recording or after recording. This removal or modification of the data to eliminate inadvertent DTMF commands can take the form of any of the processes disclosed in FIG. 15, 16 or 17. After the transfer, processing on this branch is done and returns to Start at block 750.

Returning to the consideration of block 776, if no match or partial match between the caller ID data and the data in the routing table is found, processing is vectored to block 760 to play the first outgoing message to the caller requesting the caller to enter an extension number or press the key or keys assigned for transfer to the attendant. Processing then proceeds to block 768 to monitor for DTMF tones and then to block 770 to transfer the caller either to the entered extension or to the attendant depending upon which if any keys are pressed by the caller. Processing then returns to Start.

Although the invention has been described in terms of the preferred and alternative embodiments, those skilled in the art will appreciate other embodiments or modifications which do not depart from the genus of the invention defined herein. All such departures are intended to be included within the scope of the claims appended hereto.

What is claimed is:

1. An apparatus comprising:

a computer programmed to automatically route calls based upon caller ID data, said computer having a first bus;

a host adapter circuit coupled to said first bus;

a switch card circuit coupled to said first bus and coupled to said host adapter by a second bus and including a switching circuit to transfer data between inbound and outbound timeslots, said inbound and outbound timeslots being temporarily or permanently assigned to particular extension telephones, voice mail boxes and one or more incoming telephone lines from a telephone service provider directly or indirectly through a PBX; and a port expansion circuit configured to be coupled to a telephone line from a telephone service provider or PBX and to a plurality of extension telephones or TAPI interface circuits, and coupled to said host adapter by a third bus, said port expansion circuit including a caller ID circuit coupled to said telephone line, and including analog-to-digital converter coupled to said telephone line and coupled to send digital data generated by sampling analog signals on said telephone line to said switch card, and including a digital-to-analog converter for each extension telephone which is coupled to receive digital data from said switch card and transmit the digital data as analog signals to the associated extension telephone;

wherein said port expansion circuit includes a ring detector circuit which detects incoming ring signals from incoming telephone calls and generates a control signal indicating an incoming ring;

wherein said host adapter circuit includes a microcontroller programmed to detect said control signal indicating an incoming ring and send a message to said computer that the ring signal of an incoming call has been detected;

wherein said computer sends a message to said caller ID circuit in said port expansion circuit via said host adapter to arm said caller ID circuit to receive caller ID information;

wherein said caller ID circuit detects and stores caller ID data;

wherein said microcontroller of said host adapter circuit is programmed to retrieve said caller ID data and transfer it to said computer;

wherein said computer uses said caller ID data as a search key to search a routing table to find a predetermined destination taking the form of a telephone extension internal to a PBX, an extension external to a PBX or voice mail box or voice or radio paging devices associated with the caller ID data, said predetermined destination being associated with caller ID data of the incoming call in the routing table, and, if a match is found, sends a command to said switch card to switch the incoming telephone call to the predetermined destination, and wherein said switch card further comprises a digital signal processor programmed to record voice mail messages and to process the data of a voice mail message to remove data containing any DTMF tone command or DTMF mimic.

2. The apparatus of claim 1 wherein said digital signal processor is programmed to alter the voice mail data so as to alter or suppress one or both of the two DTMF frequencies in the DTMF tone such that no DTMF tone is detected by any DTMF tone detector when the recorded data is played back.

3. The apparatus of claim 1 wherein said digital signal processor is programmed to alter or suppress one or both of the two DTMF tone frequencies in incoming data before the data of a voice mail message is recorded.

4. The apparatus of claim 1 wherein said digital signal processor is programmed to alter or suppress one or both of the two DTMF tone frequencies in the data of a voice mail message that has already been recorded.

5. An apparatus comprising:

an ISA bus to carry command and data packets;

a host adapter interface circuit coupled to said ISA bus, and having an interface to a first bus having individual send and receive time division multiplexed conductors and status and control conductors, and having interfaces to individual second and third, time-division-multiplexed, input and output buses, respectively, each of said individual second and third time-division-multiplexed input and output buses comprising one or more time-division-multiplexed conductors;

a PEU interface circuit including a first interface circuit to interface to one or more telephone lines coupled to a telephone service provider central office directly or through a PBX, said first interface circuit including one or more caller ID detector circuits coupled to detect caller ID information from incoming calls on said one or more telephone lines, said PEU interface circuit being coupled to said host adapter interface circuit through said first bus, and including a second interface circuit to interface to one or more extension phones and coupled to said host adapter interface through said first bus, and including a third interface circuit coupled to said host adapter interface through said first bus and coupled to said first interface circuit and said second interface circuit and including an analog-to-digital converter coupled to every incoming telephone line from said central office and an analog-to-digital converter coupled to every extension phone, said third interface circuit further comprising a digital-to-analog converter coupled to every incoming telephone line from said central office and a digital-to-analog converter coupled to every extension phone, said third interface circuit configured to convert analog signals received on a telephone line from said central office or from said extension phone via said first interface circuit or said second interface circuit, respectively, to digital data and to transmit said digital data to said host adapter interface circuit via said first bus, and to receive digital data destined for said central office or said extension phone from said host adapter interface circuit via said first bus and convert said digital data to analog signals and send said analog signals to said central office via an appropriate telephone line and said first interface circuit or to the destination extension phone via the second interface circuit, said second interface circuit further comprising a power ring circuit for each port to which an extension phone may be coupled, said power ring circuit functioning to generate a power ring signal and couple it to a port configured to be coupled to an extension phone when a power ring control signal is activated via said status and control conductors of said first bus;

a switching circuit coupled to said ISA bus and coupled to said host adapter interface circuit via said individual time division multiplexed send and receive buses, said switching circuit structured to transfer data between any one or more of a first plurality of timeslots on said second time division-multiplexed input bus coupled to said host adapter interface circuit, to any corresponding number of one or more timeslots of said third, time-division-multiplexed output bus coupled to said host adapter interface circuit, or vice versa in accordance with commands received via said ISA bus; and a microprocessor coupled to said host adapter interface circuit and said switching circuit via said ISA bus, and coupled to said PEU interface circuit via said host adapter interface circuit and said first bus, said microprocessor programmed by a computer program to execute a PBX process;

and wherein said first interface circuit of said PEU interface circuit includes a ring detector circuit to detect incoming ring signals on said one or more telephone lines and generate a status signal which is coupled to said host adapter via said status and control lines of said first bus;

and wherein said host adapter circuit includes a microprocessor programmed to send messages to said caller ID circuit(s) to arm one or more of said caller ID circuit(s) when so requested by said PBX process, and retrieve caller ID data from said caller ID circuit(s) and send it to said PBX process, and programmed to send messages to and receive messages from said microprocessor;

and wherein said PBX process causes said microprocessor to perform the following functions:
  determining when an incoming telephone call from said telephone service provider central office (CO) or PBX is being received on a particular telephone line using said PEU interface circuit and said host adapter interface circuit;
  sending back a message to said host adapter circuit telling it to send a message to said PEU interface circuit to arm said caller ID circuit coupled to the telephone line on which the incoming call is arriving so that the caller ID circuit can detect any caller ID information coming in;
  receiving caller ID data from said caller ID circuits and using said caller ID data as a search key to search a routing table to find a predetermined destination taking the form of a telephone extension internal to a PBX, an extension external to a PBX or voice mail box or boxes or voice or radio paging devices, said predetermined destination being associated in said routing table with the caller ID data to determine if said caller ID data completely or partially matches any caller ID data associated with a predetermined destination; and
  if there is a complete or partial match, sending a power ring control command to said power ring circuit coupled to said predetermined destination to cause a device at said predetermined destination to ring, and, if the device at the predetermined destination is answered, sending one or more commands to said switching circuit to cause transfer of said call so as to route the digital data generated by said third interface circuit from said signals on the telephone line on which the incoming call arrived to the digital-to-analog converter of said third interface circuit coupled to said device at said predetermined destination for conversion to analog signals and coupling to said device at said predetermined destination and to receive digital data generated by said analog-to-digital converter of said third interface circuit coupled to receive outgoing analog signals from said device at said predetermined destination and route the resulting digital data to a digital-to-analog converter of said third interface circuit coupled to the telephone line on which said incoming call from said CO or PBX arrived thereby causing analog signals generated by said called phone to be transmitted to said central office;

a tone generator coupled to said switching circuit via at least one of said time division multiplexed conductors of said second, time-division-multiplexed input bus, said tone generator configured to generate digital data encoding one or more different call progress tones including at least a call waiting tone to said switching circuit during one or more different timeslots;

wherein said second interface circuit includes a hybrid circuit to detect the on-hook or off-hook status of each extension phone to which it is coupled and generate off hook status signals indicating the status of each extension phone, and wherein said host adapter microprocessor is programmed to read said off hook status signals and transmit them to said PBX process;

and wherein said computer program further comprises computer code structured to cause said microprocessor to perform the following functions:
  determine if the called phone is on-hook or off-hook from said off hook status signals received from said host adapter;
  if the called phone is on-hook, send a power ring control command to said PEU interface circuit via said first bus to cause said power ring signal to be sent to said called phone, and start a timer when said power ring signal is sent, and monitor said off hook status data received from said host adapter interface circuit to determine whether the called extension phone went off-hook;
  if said target extension phone is off-hook when said incoming telephone call is automatically directed to it, send a command to said switching circuit via said ISA bus causing it to make connections suitable to send a call waiting tone to said called phone, and send the received caller ID data to said called phone for display thereon, and monitor off hook status data or any other data generated by the called phone in response to the call waiting tone indicating whether or not the user of said called phone elected to receive the call by depressing and releasing a switch hook on the called phone or issue any other command indicating the new call will be accepted;

if the user of the called phone elected to not receive the new call, or if the timer for said ring tone reaches the end of a predetermined interval without said target extension phone going off-hook, send a command to said switching circuit to make connections to connect data from said incoming telephone call to a particular output timeslot of a voice mail channel, said output timeslot being a timeslot on a conductor of said third bus dedicated to voice mail recording for the called phone, said voice mail channel defined as at least the collection of timeslots assigned to all the voice mail boxes of all the extension phones;

and wherein said switching circuit further comprises a digital signal processor coupled to said microprocessor via said ISA bus and coupled to said switching circuit via at least the conductor of said third bus carrying said voice mail channel, said digital signal processor programmed to perform the following functions:

receive data from said incoming telephone call and record it as a voice mail message, screen said data of said voice mail message for DTMF tone commands or DTMF mimics; and if any DTMF tones or DTMF mimics are found in said data, remove the data containing the DTMF tone or mimic or alter the data wherein, upon playback of the data, no DTMF tone is detected.

6. The apparatus of claim 5 wherein said digital signal processor is programmed to remove the data containing the DTMF tone or mimic before it is recorded.

7. The apparatus of claim 5 wherein said digital signal processor is programmed to remove the data containing the DTMF tone or mimic after the data has been recorded as a voice mail message.

8. The apparatus of claim 5 wherein said digital signal processor is further programmed to alter the voice mail data so as to alter or suppress one or both of two DTMF frequencies in a DTMF tone command or mimic such that there will be no DTMF tone detected by any DTMF tone detector when the recorded data is played back.

9. The apparatus of claim 8 wherein said digital signal processor is programmed to alter or suppress one or both of the two DTMF tone frequencies in the data of a voice mail message that has already been recorded.

10. A process for routing phone calls in a multiple extension telephone system sometimes without intervention by a human attendant, comprising:

detecting an incoming ring signal of an incoming telephone call;

determining if the incoming ring signal includes caller ID data, and, if so, capturing the caller ID data and transferring it to an automatic routing process in execution in a computer controlling said multiple extension telephone system; and causing the incoming telephone call to be answered and playing one or more of two pre-recorded messages to the caller:

if the incoming call has no caller ID data or the caller ID data is blocked, playing a first message that requests the caller to enter the extension number of the person the caller wishes to speak to or to press a predetermined combination of one or more keys on a touchtone telephone indicating the caller desires to speak to an attendant;

if the incoming call has caller ID data, playing a second message telling the caller that the call will be automatically transferred to a predetermined destination taking the form of a telephone extension internal to a PBX, an extension external to a PBX or voice mail box or boxes or voice or radio paging devices associated with the caller ID data of the caller unless the caller presses any key or a predetermined key or combination of keys on his or her touchtone telephone keypad within a predetermined amount of time made known to the caller;

if caller ID data was detected but the caller presses said predetermined key or combination of keys indicating automatic transfer is not desired, playing said first message that requests the caller to enter the extension number of the person the caller wishes to speak to or to press a predetermined combination of one or more keys on a touchtone telephone indicating the caller desires to speak to an attendant;

if the caller does not press any key or the predetermined key or combination of keys before the timeout interval expires in response to said second message, using the caller ID of the call as a search key in a routing table to look up a predetermined destination taking the form of a telephone extension internal to a PBX, an extension external to a PBX or voice mail box or boxes or voice or radio paging devices associated with the caller ID data of the caller, if any, and, if a match or partial match is found, transferring the call to the predetermined destination, and if there is no match in the routing table, playing said first message that requests the caller to enter the extension number of the person the caller wishes to speak to or to press a predetermined combination of one or more keys on a touchtone telephone indicating the caller desires to speak to an attendant; and if the caller either has no caller ID data or the caller ID data is blocked, monitoring the telephone line from said central office for DTMF tones resulting from pressing of one or more touchtone telephone keys in response to said first message indicating either the extension the caller wishes to call or that the caller wishes to speak to an attendant for further transfer and transferring the call either to the indicated extension or to an attendant.

11. The process of claim 10 further comprising removing any DTMF tones or mimics before the data is recorded as a voice mail message.

12. The process of claim 10 further comprising removing any data encoding DTMF tones or mimics after the data has been recorded as a voice mail message.

13. The process of claim 10 further comprising altering any data containing DTMF tones or mimics by filtering out one or both tones of any DTMF tone or mimic in one or more digital filters tuned to have a zero at a frequency of said DTMF tone or mimic.

14. The process of claim 13 wherein the altering data containing DTMF tones or mimics is performed after the data has been recorded as a voice mail message.

15. A microprocessor in a telephone system having one or more incoming telephone lines directly from a telephone service provider or indirectly through a PBX and programmed to perform the following functions:

(1) detecting a ring signal of an incoming telephone call on a telephone line from said telephone service provider directly or indirectly through a PBX;

(2) determining if the incoming ring signal includes caller ID data, and, if so, capturing the caller ID data and transferring it to an automatic routing process in execution on a computer controlling said multiple extension telephone system;

(3) causing the incoming telephone call to be answered and playing one of two pre-recorded messages to the caller:

if the incoming call has no caller ID data or the caller ID data is blocked, playing a first message that requests the caller to enter the extension number of the person the caller wishes to speak to or to press a predetermined combination of one or more keys on a touchtone telephone indicating the caller desires to speak to an attendant;

if the incoming call has caller ID data, playing a second message telling the caller that the call will be automatically transferred to the extension the caller usually calls unless the caller presses any key or a predetermined key or combination of keys on his or her touchtone telephone keypad within a predetermined amount of time made known to the caller;

if caller ID data was detected but the caller presses said predetermined key or combination of keys indicating automatic transfer is not desired, playing said first message that requests the caller to enter the extension number of the person the caller wishes to speak to or to press a predetermined combination of one or more keys on a touchtone telephone indicating the caller desires to speak to an attendant; and (4) monitoring for DTMF tones, and, if the caller does not press any key or the predetermined key or combination of keys before a timeout interval expires in response to said second message, using the caller ID of the call as a search key in a routing table to look up the extension the caller normally calls, if any, and, if a match or partial match is found, issuing commands to cause the call to be transferred to the extension or voice mail box the person normally calls, and if there is no match in the routing table, playing said first message that requests the caller to enter the extension number of the person the caller wishes to speak to or to press a predetermined combination of one or more keys on a touchtone telephone indicating the caller desires to speak to an attendant;

(5) if the caller either has no caller ID data or the caller ID data is blocked, monitoring the telephone line from said central office for DTMF tones resulting from one or more presses of touchtone telephone keys in response to said first message indicating either the extension the caller wishes to call or that the caller wishes to speak to an attendant for further transfer and issuing commands to cause transfer of the call either to the indicated extension or to an attendant.

16. The microprocessor of claim 15 further programmed to:

play an outgoing third message at the start of the voice mail recording process indicating the caller can either record a message or enter the extension of another party or press one or more predetermined keys indicating a transfer to the operator is desired;

listen for DTMF tones entered by the caller in response to said outgoing third message;

if any DTMF tones were entered indicating a desired transfer to another extension or the attendant in lieu of recording a voice mail message, issuing commands to transfer the call to the designated extension or to the extension of the attendant;

if no DTMF tones were entered in response to the outgoing third message, playing a beep tone to the caller indicating voice mail recording is starting, and monitoring the incoming data for a # key or 0 key DTMF command pressed by the caller during the voice mail recording interval;

stopping voice mail recording if either the # key or 0 key DTMF tones are detected or if a timeout occurs;

if the # key was pressed, playing an outgoing fourth message giving the caller more dialing options;

if the 0 key was pressed, issuing commands to cause transfer of the call to the attendant; and if neither the 0 key or # key were pressed during the voice mail recording interval, storing the voice mail message in a nonvolatile memory.

17. The microprocessor of claim 16 further programmed to filter out any DTMF commands received during the voice mail recording interval either during or after recording the voice mail message on said nonvolatile memory while still causing the specified action in case the # key or 0 key is pressed during the voice mail recording interval.

* * * * *